US012561110B2

(12) United States Patent
Zhu et al.

(10) Patent No.: US 12,561,110 B2
(45) Date of Patent: Feb. 24, 2026

(54) AUDIO PLAYBACK METHOD AND APPARATUS, COMPUTER READABLE STORAGE MEDIUM, AND ELECTRONIC DEVICE

(71) Applicant: Shenzhen Horizon Robotics Technology Co., Ltd., Guangdong (CN)

(72) Inventors: Changbao Zhu, Guangdong (CN); Jianwei Niu, Guangdong (CN); Kai Yu, Guangdong (CN)

(73) Assignee: Shenzhen Horizon Robotics Technology Co., Ltd., Guangdong (CN)

( * ) Notice: Subject to any disclaimer, the term of this patent is extended or adjusted under 35 U.S.C. 154(b) by 309 days.

(21) Appl. No.: 18/247,754

(22) PCT Filed: Feb. 14, 2022

(86) PCT No.: PCT/CN2022/076239
§ 371 (c)(1),
(2) Date: Apr. 4, 2023

(87) PCT Pub. No.: WO2022/218027
PCT Pub. Date: Oct. 20, 2022

(65) Prior Publication Data
US 2024/0004606 A1     Jan. 4, 2024

(30) Foreign Application Priority Data
Apr. 16, 2021     (CN) ......................... 202110410353.9

(51) Int. Cl.
*G06F 3/16*          (2006.01)
*G06V 20/50*         (2022.01)
(Continued)

(52) U.S. Cl.
CPC .............. *G06F 3/165* (2013.01); *G06V 20/50* (2022.01); *G06V 40/166* (2022.01);
(Continued)

(58) Field of Classification Search
None
See application file for complete search history.

(56) References Cited

U.S. PATENT DOCUMENTS 9,202,520 B1 * 12/2015 Tang .................... G10H 1/0008
10,102,851 B1 * 10/2018 Kiss ........................ G10L 15/05
(Continued)

FOREIGN PATENT DOCUMENTS

| CN | 102970427 A | 3/2013 |
|---|---|---|
| CN | 107609034 A | 1/2018 |

(Continued)

OTHER PUBLICATIONS

First Chinese Office Action and its Search Report of the corresponding Chinese Patent Application No. 202110410353.9, mailed on Aug. 19, 2023 (English Translation).
(Continued)

*Primary Examiner* — Jonathan C Kim
(74) *Attorney, Agent, or Firm* — K&L Gates LLP

(57)          ABSTRACT

Disclosed in the embodiments of the present disclosure are an audio playback method and apparatus, a computer readable storage medium, and an electronic device. The method includes: acquiring intention determination data collected for at least one user within a target space; determining that at least one user has a target vocal intention based on the intention determination data, and then determining feature information representing a current feature of the at least one user; and extracting and playing an audio corresponding to the feature information from a preset audio library. According to the embodiments of the present disclosure, it is (Continued)

achieved to automatically perform a determination on the target vocal intention of the user by the electronic device, without triggering an audio playing operation by the user, the steps of performing the audio playing operation by the user being omitted, and the convenience of the audio playing operation being improved. In addition, by determining the current feature of the user, the played audio is adapted to the feature of the user so as to achieve an effect of more accurately playing the audio which the user wants to listen to and improve pertinence of automatic playback of the audio.

15 Claims, 9 Drawing Sheets

(51) Int. Cl.

| | | |
|---|---|---|
| *G06V 40/16* | (2022.01) | |
| *G10H 1/00* | (2006.01) | |
| *G10L 15/02* | (2006.01) | |
| *G10L 15/18* | (2013.01) | |
| *G10L 15/22* | (2006.01) | |
| *G10L 21/028* | (2013.01) | |
| *G10L 25/63* | (2013.01) | |

(52) U.S. Cl.
CPC .......... *G06V 40/168* (2022.01); *G06V 40/176* (2022.01); *G10H 1/0008* (2013.01); *G10L 15/02* (2013.01); *G10L 15/1815* (2013.01); *G10L 15/22* (2013.01); *G10L 21/028* (2013.01); *G10L 25/63* (2013.01); *G10H 2210/056* (2013.01); *G10L 2015/223* (2013.01)

(56) References Cited

U.S. PATENT DOCUMENTS

| | | | | |
|---|---|---|---|---|
| 10,854,182 | B1 * | 12/2020 | Huang | G10H 1/366 |
| 2003/0078919 | A1 * | 4/2003 | Suzuki | G06F 16/40 |
| 2004/0128141 | A1 * | 7/2004 | Murase | G10L 15/22 |
| | | | | 704/E15.04 |
| 2009/0022330 | A1 * | 1/2009 | Haulick | H04M 9/082 |
| | | | | 381/86 |
| 2009/0063414 | A1 * | 3/2009 | White | G06F 3/04817 |
| 2013/0185069 | A1 * | 7/2013 | Tanaka | G10L 15/26 |
| | | | | 704/235 |
| 2015/0194151 | A1 * | 7/2015 | Jeyachandran | G10L 15/20 |
| | | | | 704/233 |
| 2018/0277145 | A1 * | 9/2018 | Yamaya | G10L 25/63 |
| 2020/0151212 | A1 * | 5/2020 | Li | G06F 3/165 |
| 2021/0191973 | A1 * | 6/2021 | Marchini | G06F 16/686 |
| 2021/0304789 | A1 | 9/2021 | Ma | |
| 2021/0357173 | A1 * | 11/2021 | Wei | H04N 21/4394 |
| 2022/0139389 | A1 * | 5/2022 | Zhu | G06F 3/167 |
| | | | | 704/275 |
| 2022/0245970 | A1 * | 8/2022 | Jung | G10L 15/22 |
| 2022/0358919 | A1 * | 11/2022 | Xu | G10L 15/22 |
| 2023/0171541 | A1 * | 6/2023 | Kang | H04R 3/005 |
| | | | | 381/92 |
| 2023/0245586 | A1 * | 8/2023 | Livne | G09B 15/023 |
| | | | | 434/308 |
| 2024/0004606 | A1 * | 1/2024 | Zhu | G06V 40/166 |
| 2024/0135945 | A1 * | 4/2024 | Takahashi | G10L 25/30 |

FOREIGN PATENT DOCUMENTS

| | | | | | |
|---|---|---|---|---|---|
| CN | 107632814 | A | 1/2018 | | |
| CN | 108848416 | A | 11/2018 | | |
| CN | 109508403 | A | 3/2019 | | |
| CN | 110096611 | A | 8/2019 | | |
| CN | 110111795 | A | 8/2019 | | |
| CN | 110197677 | A | 9/2019 | | |
| CN | 110413250 | A | 11/2019 | | |
| CN | 111199732 | A | 5/2020 | | |
| CN | 111523981 | A | 8/2020 | | |
| CN | 111754965 | A | 10/2020 | | |
| CN | 111968611 | A | 11/2020 | | |
| CN | 111984818 | A | * 11/2020 | .......... | G06F 16/634 |
| CN | 112397065 | A | 2/2021 | | |
| CN | 113126951 | A | 7/2021 | | |
| JP | 2000099014 | A | 4/2000 | | |
| JP | 2000330576 | A | 11/2000 | | |
| JP | 2003132085 | A | 5/2003 | | |
| JP | 2004163590 | A | 6/2004 | | |
| JP | 2008216402 | A | 9/2008 | | |
| JP | 2016188978 | A | * 11/2016 | | |
| JP | 2019132980 | A | 8/2019 | | |
| WO | WO-2018010375 | A1 * | 1/2018 | ............ | G10L 13/02 |
| WO | 2022218027 | A1 | 10/2022 | | |

OTHER PUBLICATIONS

Chunhua et al., "User-Mood Incorporated Hybrid Music-Recommendation Method", Journal of the China Society for Scientific and Technical Information, Jun. 2017, 36(6):578-589.

First Japanese Office Action from the corresponding Japanese Patent Application No. 2022-573581, mailed on Dec. 5, 2023 (English Translation).

The Second Chinese Office Action from the corresponding Chinese Patent Application No. 202110410353.9, mailed on Jan. 5, 2024.

* cited by examiner

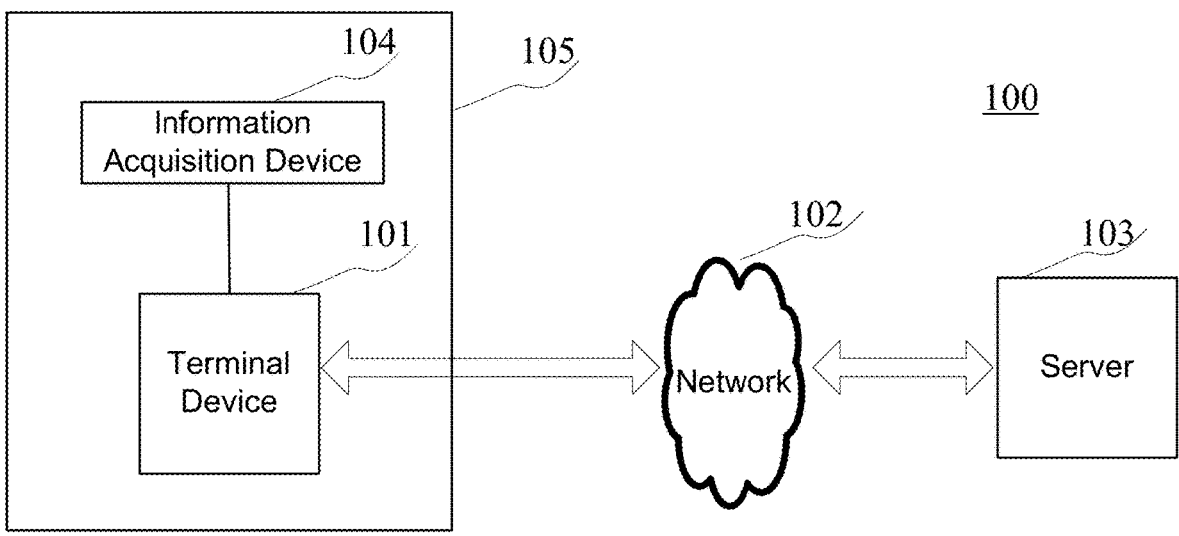

FIG. 1

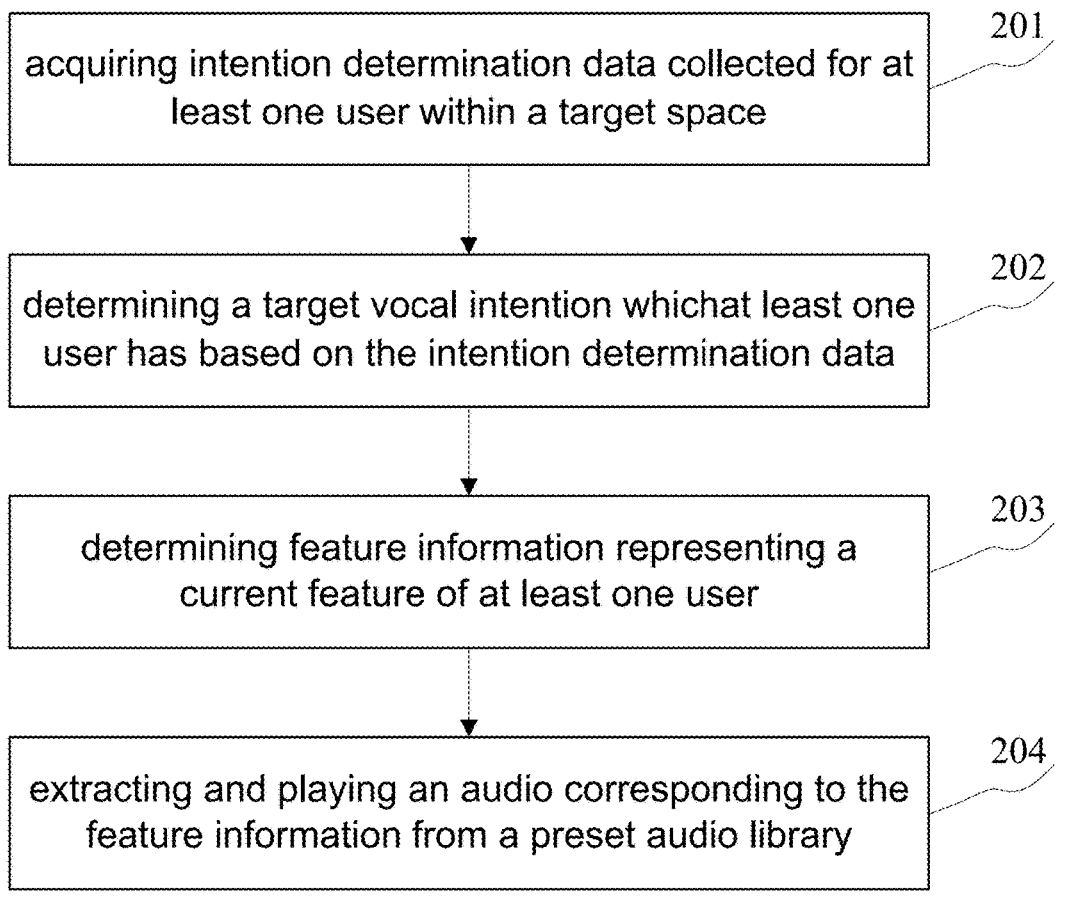

acquiring intention determination data collected for at least one user within a target space    201 determining a target vocal intention whichat least one user has based on the intention determination data    202 determining feature information representing a current feature of at least one user    203 extracting and playing an audio corresponding to the feature information from a preset audio library    204

FIG. 2

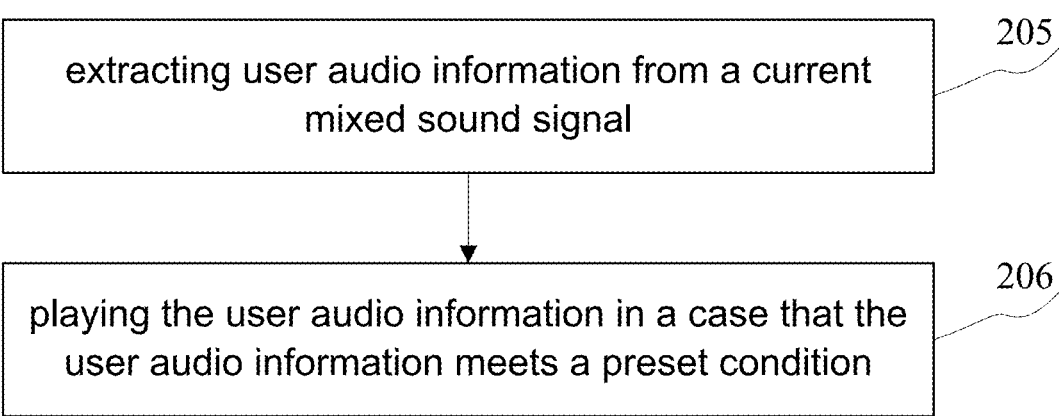

extracting user audio information from a current mixed sound signal — 205 playing the user audio information in a case that the user audio information meets a preset condition — 206

FIG. 3

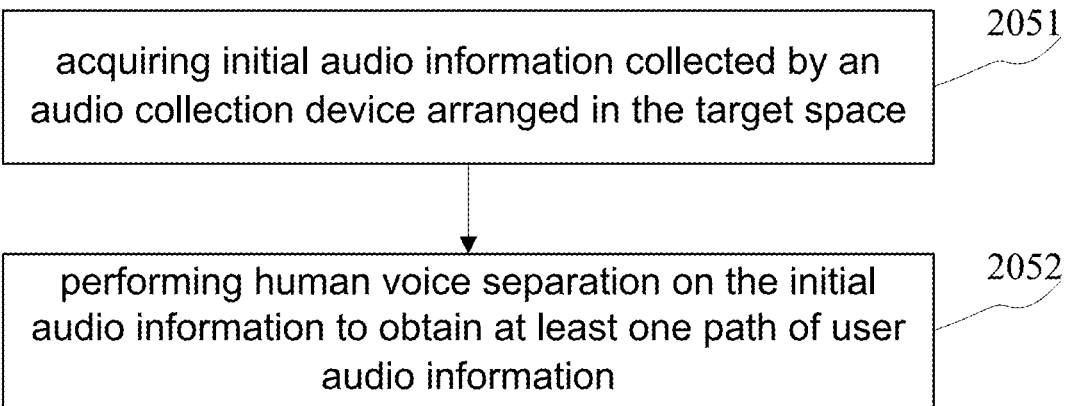

acquiring initial audio information collected by an audio collection device arranged in the target space — 2051 performing human voice separation on the initial audio information to obtain at least one path of user audio information — 2052

FIG. 4

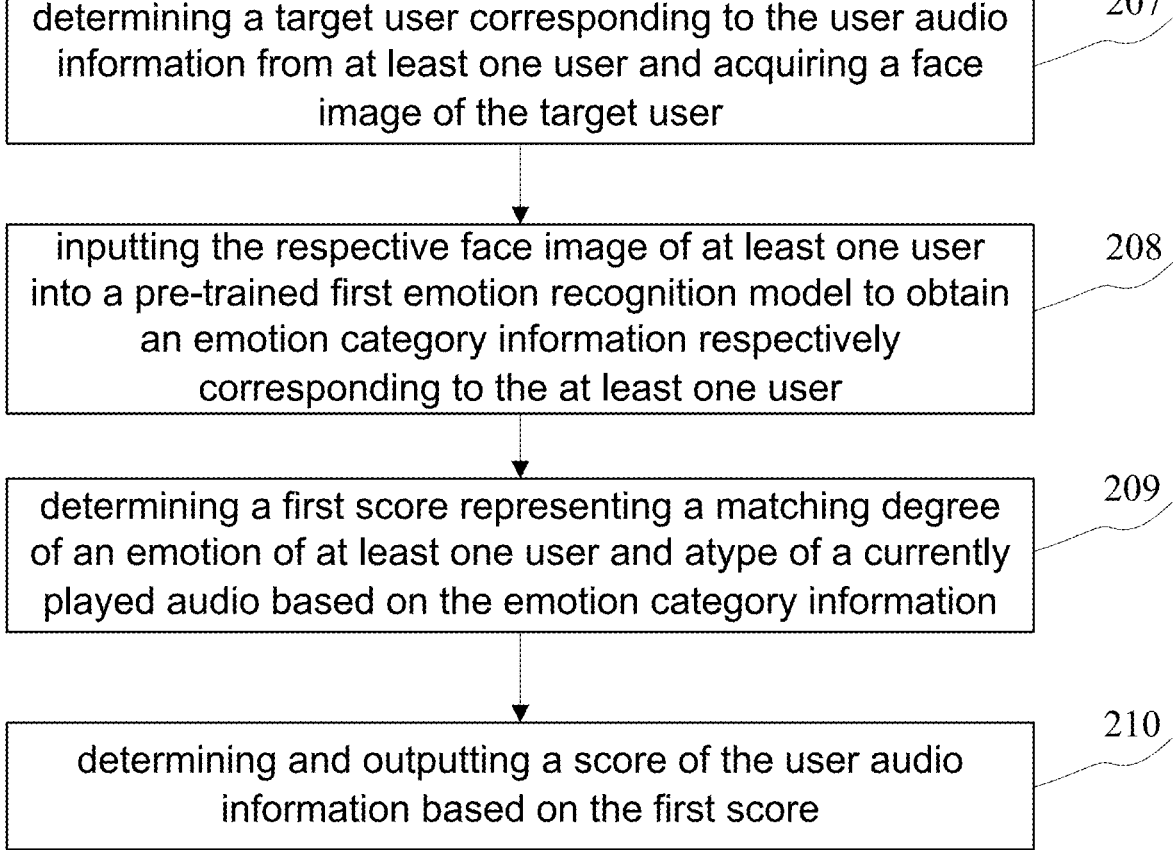

determining a target user corresponding to the user audio
information from at least one user and acquiring a face
image of the target user                                          207 inputting the respective face image of at least one user
into a pre-trained first emotion recognition model to obtain
an emotion category information respectively
corresponding to the at least one user                            208 determining a first score representing a matching degree
of an emotion of at least one user and atype of a currently
played audio based on the emotion category information            209 determining and outputting a score of the user audio
information based on the first score                               210

FIG. 5

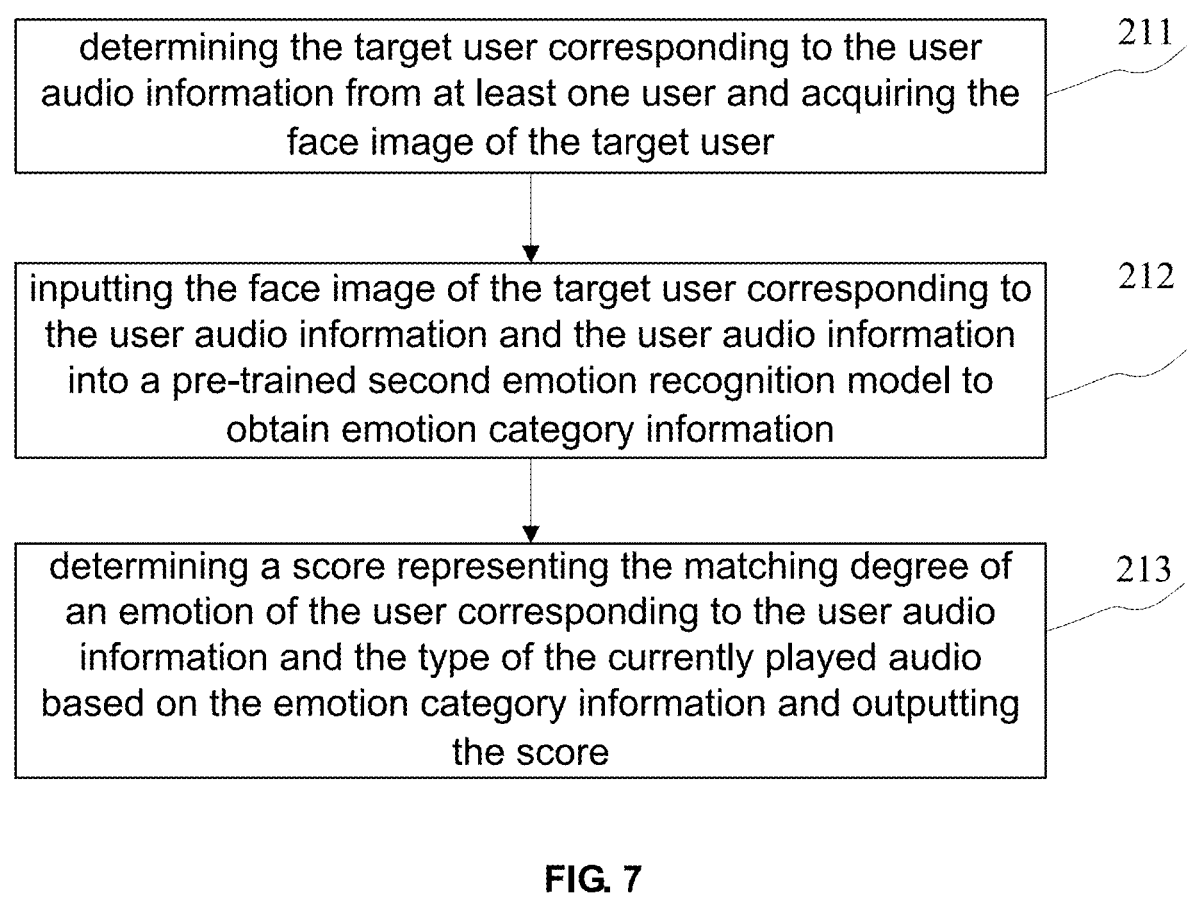

```
                                                                      211
┌──────────────────────────────────────────────────────┐
│   determining the target user corresponding to the user │
│  audio information from at least one user and acquiring the │
│              face image of the target user              │
└──────────────────────────────────────────────────────┘
                              │
                              ▼
                                                                      212
┌──────────────────────────────────────────────────────┐
│  inputting the face image of the target user corresponding to │
│   the user audio information and the user audio information │
│    into a pre-trained second emotion recognition model to │
│            obtain emotion category information           │
└──────────────────────────────────────────────────────┘
                              │
                              ▼
                                                                      213
┌──────────────────────────────────────────────────────┐
│  determining a score representing the matching degree of │
│   an emotion of the user corresponding to the user audio │
│   information and the type of the currently played audio │
│  based on the emotion category information and outputting │
│                       the score                         │
└──────────────────────────────────────────────────────┘
```

FIG. 7

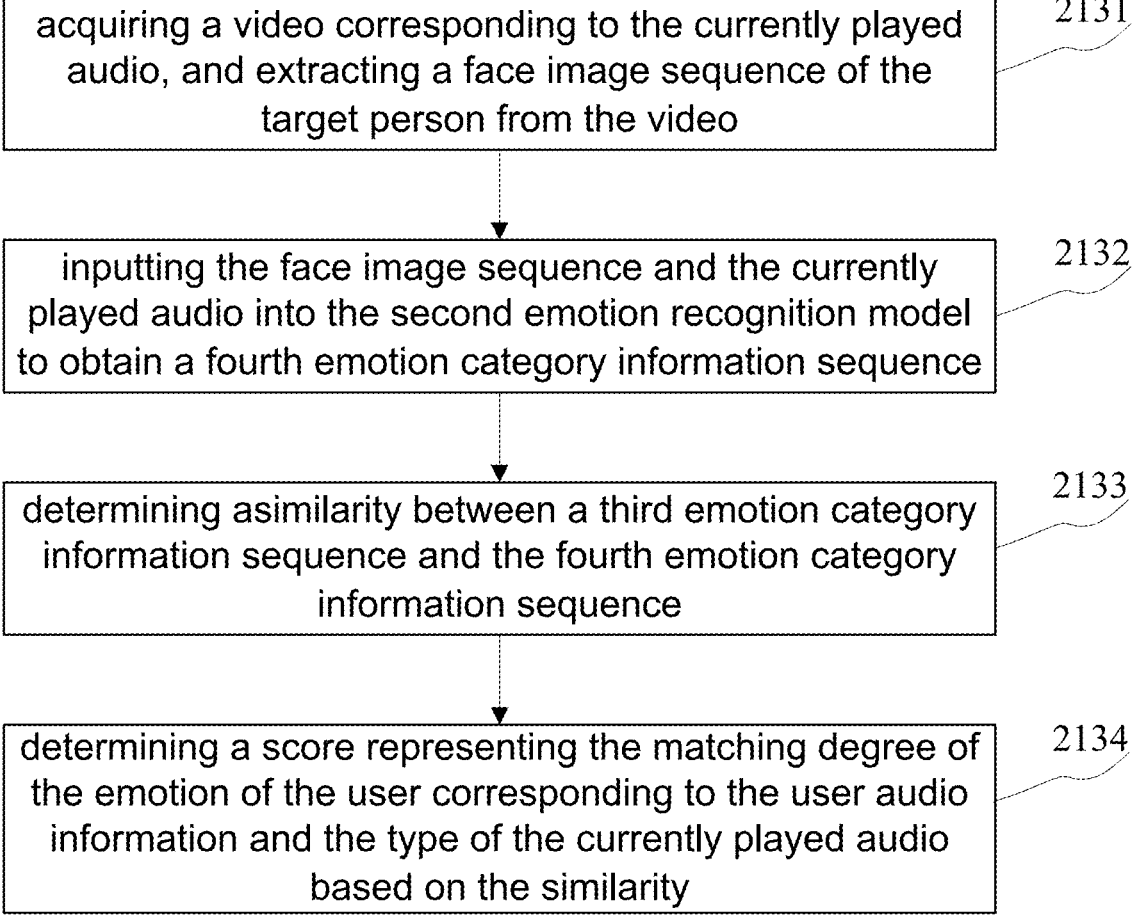

acquiring a video corresponding to the currently played audio, and extracting a face image sequence of the target person from the video                    2131 inputting the face image sequence and the currently played audio into the second emotion recognition model to obtain a fourth emotion category information sequence                    2132 determining asimilarity between a third emotion category information sequence and the fourth emotion category information sequence                    2133 determining a score representing the matching degree of the emotion of the user corresponding to the user audio information and the type of the currently played audio based on the similarity                    2134

FIG. 8

AUDIO PLAYBACK METHOD AND APPARATUS, COMPUTER READABLE STORAGE MEDIUM, AND ELECTRONIC DEVICE

CROSS-REFERENCE TO RELATED APPLICATIONS

This application is a U.S. National Stage Entry under 35 U.S.C. § 371 of International Patent Application No. PCT/CN2022/076239, entitled AUDIO PLAYBACK METHOD AND APPARATUS, COMPUTER READABLE STORAGE MEDIUM, AND ELECTRONIC DEVICE, filed Feb. 14, 2022, which claims priority to and the benefit of Chinese Patent Application No. 202110410353.9, entitled AUDIO PLAYBACK METHOD AND APPARATUS, COMPUTER READABLE STORAGE MEDIUM, AND ELECTRONIC DEVICE, filed with the China National Intellectual Property Administration (CNIPA) on Apr. 16, 2021, the entire disclosures of which are incorporated by reference in their entirety herein.

TECHNICAL FIELD

The present disclosure relates to the technical field of a computer and particularly relates to an audio playback method and apparatus, a computer readable storage medium, and an electronic device.

BACKGROUND

In recent years, with the continuous promotion of intelligent electronic devices, human-machine interaction means are more and more rich. People interact with devices by ways of speech recognition, gesture recognition, etc. For example, in the field of intelligent automobiles, a user can control vehicle-mounted electronic devices by ways of manual operation, speech control and the like, e.g., start up music playback, turn on or off an air conditioner, set navigation, modify navigation, etc. When the user controls an audio playback device, at present, ways of manual control, speech recognition, and the like are mainly adopted to actively control the audio playback device to play music, turn on a radio, and the like.

SUMMARY

Embodiments of the present disclosure provide an audio playback method and apparatus, a computer readable storage medium, and an electronic device.

The embodiments of the present disclosure disclose an audio playback method. The method includes: acquiring intention determination data collected for at least one user within a target space; determining a target vocal intention which the at least one user has based on the intention determination data; determining feature information representing a current feature of the at least one user based on the target vocal intention; and extracting and playing an audio corresponding to the feature information from a preset audio library.

According to another aspect of the embodiments of the present disclosure, disclosed is an audio playback apparatus. The apparatus includes: an acquisition module configured for acquiring intention determination data collected for at least one user within a target space; a first determination module configured for determining a target vocal intention of the at least one user based on the intention determination data; a second determination module configured for determining feature information representing a current feature of the at least one user based on the target vocal intention; and a first playback module configured for extracting and playing an audio corresponding to the feature information from a preset audio library.

According to yet another aspect of the embodiments of the present disclosure, provided is a computer readable storage medium which stores a computer program for executing the above-mentioned audio playback method.

According to still a further aspect of the embodiments of the present disclosure, provided is an electronic device including: a processor; and a memory for storing a processor-executable instruction, wherein the processor is configured for reading the executable instruction from the memory and executing the instruction to implement the above-mentioned audio playback method.

Based on the audio playback method and apparatus, the computer readable storage medium, and the electronic device provided by the above-mentioned embodiments of the present disclosure, by collecting the intention determination data for at least one user in the target space, determining the target vocal intention of the at least one user according to the intention determination data, then determining the feature information according to the target vocal intention, and finally extracting and playing the audio corresponding to the feature information from the preset audio library. Accordingly, it is achieved to automatically perform a determination on the target vocal intention of the user by the electronic device, and the electronic device automatically plays the audio when it is determined that the user has the vocal intention, without triggering an audio playing operation by the user, the steps of performing the audio playing operation by the user being omitted, and the convenience of the audio playing operation being improved. In addition, by determining the current feature of the user, the played audio is adapted to the feature of the user so as to achieve an effect of more accurately playing the audio which the user wants to listen to and improve pertinence of automatic playback of the audio.

The technical solutions of the present disclosure will be further described in detail below by the drawings and the embodiments.

BRIEF DESCRIPTION OF DRAWINGS

The above and other objectives, features and advantages of the present disclosure will become more apparent by describing the embodiments of the present disclosure in more detail in combination with the accompanying drawings. The accompanying drawings are provided for further understanding of the embodiments of the present disclosure, constituting one part of this specification, and are used for explaining the present disclosure together with the embodiments of the present disclosure, without limiting the present disclosure. In the accompanying drawings, the same reference signs generally represent the same parts or steps.

FIG. 1 is a diagram of a system to which the present disclosure is applicable.

FIG. 2 is a flow schematic diagram of an audio playback method provided by an exemplary embodiment of the present disclosure.

FIG. 3 is a flow schematic diagram of an audio playback method provided by another exemplary embodiment of the present disclosure.

FIG. 4 is a flow schematic diagram of an audio playback method provided by yet another exemplary embodiment of the present disclosure.

FIG. 5 is a flow schematic diagram of an audio playback method provided by still a further exemplary embodiment of the present disclosure.

FIG. 7 is a flow schematic diagram of an audio playback method provided by one more exemplary embodiment of the present disclosure.

FIG. 8 is a flow schematic diagram of an audio playback method provided by a related exemplary embodiment of the present disclosure.

DETAILED DESCRIPTION OF THE EMBODIMENTS

Figure 6:
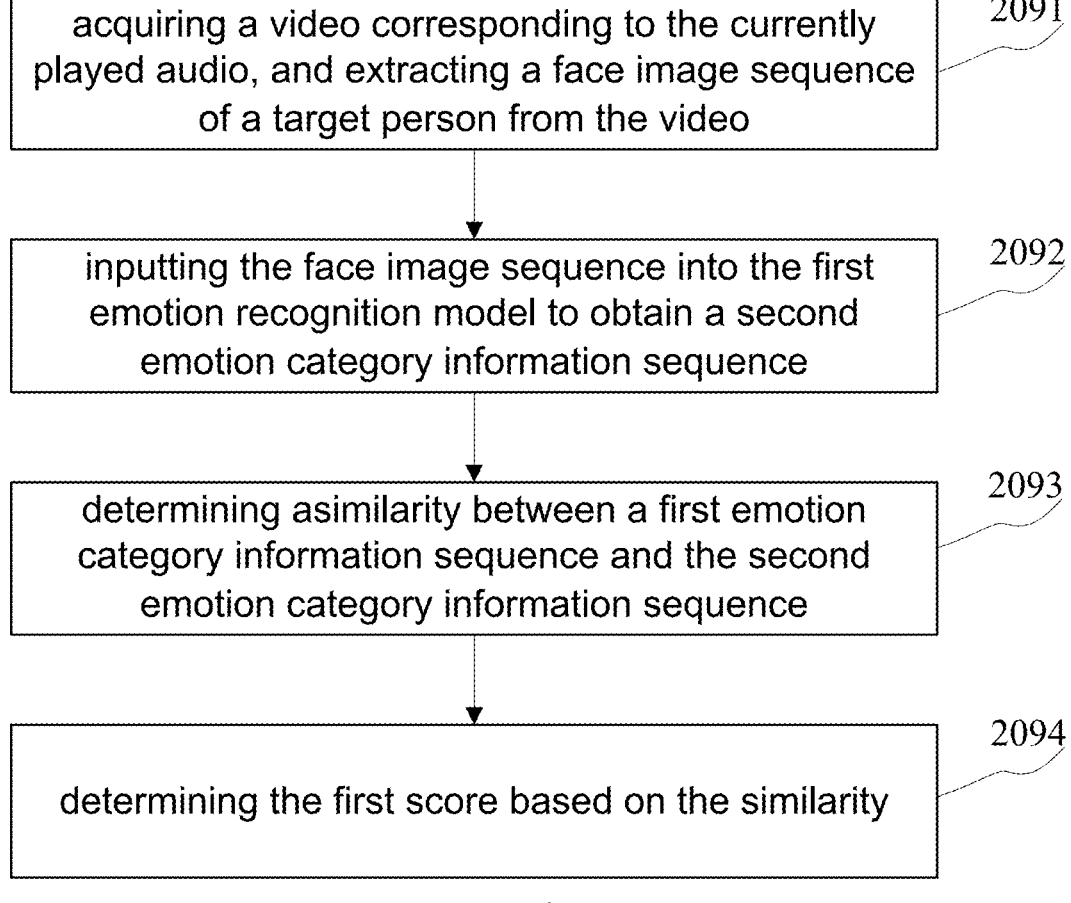
FIG. 6 is a flow schematic diagram of an audio playback method provided by another exemplary embodiment of the present disclosure.

The exemplary embodiments according to the present disclosure will be described in detail below with reference to the accompanying drawings. It is obvious that the described embodiments are just a part, but not all of the embodiments of the present disclosure. It should be understood that the present disclosure is not limited to the exemplary embodiments described herein.

It should be noted that: unless specified otherwise, relative arrangement, numerical expressions, and values for parts and steps described in those embodiments do not limit the scope of the present disclosure.

Those skilled in the art may understand that the terms such as "first", "second", and the like in the embodiments of the present disclosure are merely used to distinguish among different steps, devices, or modules, and the like, and represent neither any specific technical meaning, nor the necessary logic sequence between them.

It also should be understood that in the embodiments of the present disclosure, "plurality of" may refer to two or more and "at least one" may refer to one, two or more.

It also should be understood that any singular number expression for part, data or structure to which the embodiments of the present disclosure refer, generally may be understood as one or more, unless clearly expressed otherwise in the context.

In addition, in the present disclosure, the term "and/or" is merely an association that describes associated objects, and indicates that there may be three relationships, and for example, A and/or B may indicate three cases that: presence of only A, presence of both A and B, and presence of only B. In addition, in the present disclosure, the character "/" generally represents that the relationship between the context associated objects is an "or" relationship.

It also should be understood that the description on various embodiment in the present disclosure emphasizes the differences between the embodiments, and the same or similar points may be referred to each other and will not be repeated herein for conciseness.

Meanwhile, it should be understood that in order to facilitate description, the size of each part shown in the accompanying drawings is not necessarily scaled according to an actual proportional relationship.

The following description on at least one exemplary embodiment is merely illustrative in practice and is never intended to limit the present disclosure and application or use thereof.

Technologies, methods, and devices known to those ordinary skilled in the relevant art may not be discussed in detail, but in a proper case, the technologies, methods, and devices should be considered as a part of the specification.

It should be noted that: similar numerals and signs refer to similar items in the following accompanying drawings, and thus, once some item is defined in one accompanying drawing, it may not be further discussed necessarily in the subsequent accompanying drawings.

The embodiments of the present disclosure can be applied to electronic devices such as a terminal device, a computer system, a server, and the like, which may be operated together with numerous other general purpose or special purpose computing systems, environments or configurations. Examples of well-known terminal devices, computing systems, environments, and/or configurations suitable for use together with the electronic devices such as the terminal device, the computer system, the server, and the like include, but are not limited to: a personal computer system, a server computer system, a thin client, a thick client, a hand-held or laptop device, a microprocessor-based system, a set top box, a programmable consumer electronic product, a network personal computer, a small computer system, a large computer system, a distributed cloud computing technical environment including any of the systems above, and the like.

The electronic device such as the terminal device, the computer system, the server, and the like may be described in the general context of computer system executable instructions (such as program modules) performed by the computer system. Typically, the program modules may include routines, programs, object programs, components, logic, data structures, and the like which execute specific tasks or implement specific abstract data types. The computer system/server may be implemented in the distributed cloud computing environment, and in the distributed cloud computing environment, tasks are performed by a remote processing device linked through a communication network. In the distributed cloud computing environment, the program module may be located on storage medium including a storage device in a local or remote computing system.

Application Overview

For a current audio playback system, typically, a user needs to manually select an audio to be played or triggers audio playback by ways of speech recognition, gesture recognition, etc. These ways often require the user to actively interact with the audio playing system, cannot implement automatic decision on a vocal intention of the user, resulting in insufficient convenience of audio playback, and cannot implement automatic a playback on the corresponding audio according to features of the user, resulting in insufficient pertinence of audio playback.

Exemplary System

FIG. 1 shows an exemplary system architecture 100 capable of applying an audio playback method or an audio playback apparatus according to an embodiment of the present disclosure.

As shown in FIG. 1, the system architecture 100 may include a terminal device 101, a network 102, a server 103, and an information collection device 104. The network 102 is used for providing a medium of a communication link between the terminal device 101 and the server 103. The network 102 may include various connection types, such as a wired connection type, a wireless communication link, an fiber optic cable, or the like.

The user may interact with the server 103 by using the terminal device 101 through the network 102 so as to receive or send messages and the like. Various communication client applications such as an audio player, a video player, a web browser application, an instant messenger, and the like may be installed on the terminal device 101.

The terminal device 101 may be one of various electronic devices capable of performing audio playback, including, but not limited to, mobile terminals such as a vehicle-mounted terminal, a mobile phone, a notebook computer, a digital broadcast receiver, a Personal Digital Assistant (PDA), a PAD, a Portable Multimedia Player (PMP), and the like and fixed terminals such as a digital TV, a desktop computer, an intelligent household appliance, and the like.

The information collection device 104 may be one of various devices for collecting user-related information (including intention determination data), including, but not limited to, at least one of a camera, a microphone, and the like.

Generally, the terminal device 101 is disposed within a space 105 of which the range is defined, and the information collection device 104 is associated with the space 105. For example, the information collection device 104 may be disposed inside the space 105 for collecting various information such as an image, sound, and the like of the user, or may be disposed outside the space 105 for collecting various information such as an image, sound, and the like around the space 105. The space 105 may be one of various spaces of which the ranges are defined, e.g., the inside of a vehicle, the inside of a room, and the like.

The server 103 may be a server that provides various services, e.g., a background audio server that provides support for an audio played on the terminal device 101. The background audio server can process the received intention determination data to obtain information such as a target vocal intention of the user, feature information of the user, an audio to be played, and the like.

It should be noted that the audio playback method provided by the embodiment of the present disclosure may be performed by the server 103 or may be performed by the terminal device 101, and accordingly, the audio playback apparatus may be disposed in the server 103 or may be disposed in the terminal device 101. The audio playback method provided by the embodiment of the present disclosure can also be performed jointly by the terminal device 101 and the server 103, for example, steps of acquiring the intention determination data and determining the target vocal intention are performed by the terminal device 101, steps of determining the feature information and extracting the audio are performed by the server 103, and accordingly, the respective modules included in the audio playback apparatus can be disposed in the terminal device 101 and the server 103, respectively.

It should be understood that the numbers of the terminal devices, the networks, and the servers in FIG. 1 are merely schematic. There may be any numbers of terminal devices, networks, servers, and information collection devices according to practical demands. For example, in a case that a preset audio library is disposed locally, the above system architecture may not include the network and the server, but include only the terminal device and the information collection device.

Exemplary Method

FIG. 2 is a flow schematic diagram of an audio playback method provided by an exemplary embodiment of the present disclosure. This embodiment can be applied to an electronic device (e.g., the terminal device 101 or the server 103 as shown in FIG. 1), and as shown in FIG. 2, the method includes the following steps:

S201: acquiring intention determination data collected for at least one user within a target space.

In this embodiment, the electronic device may acquire the intention determination data collected for at least one user within the target space, wherein the target space (e.g., the space 105 in FIG. 1) may be various spaces such as the inside of a vehicle, the inside of a room, or the like. The intention determination data may be various data used to determine an intention of the user, for example, including, but not limited to, at least one type of face image data of the user, voice produced by the user, and the like.

S202: determining a target vocal intention of the at least one user based on the intention determination data;

In this embodiment, the electronic device can determine the target vocal intention of the at least one user based on the intention determination data, wherein the voice production type represented by the target vocal intention may be preset. For example, the target vocal intention may include, but not limited to, at least one of a singing intention, a reciting intention, and the like. The electronic device may select a corresponding way for determining the target vocal intention according to a type of the intention determination data.

As an example, when the intention determination data includes the face image data of the user, emotion recognition may be performed on the face image to obtain an emotion type. If the emotion type indicates pleasure, it may be determined that the at least one user has the target vocal intention (e.g., a singing intention). When the intention determination data includes a sound signal issued by the user, the sound signal may be recognized. If a recognition result indicates that the user is humming, it may be determined that there is the target vocal intention.

S203: determining feature information representing a current feature of the at least one user based on the target vocal intention.

In this embodiment, the electronic device may determine the feature information representing the current feature of the at least one user, wherein the current feature of the user may include, but be not limited to, at least one of an emotion of the user, a number of users, listening habits of the user, and the like. The electronic device may determine the feature information by ways respectively corresponding to the above-mentioned various features. For example, the face image shot by a camera on the user can be acquired, and emotion recognition is performed on the face image so as to obtain the feature information representing the current emotion of the user. For another example, a historical playback record of the user may be acquired, and the type of an audio that the user is used to listening to may be determined as the feature information from the historical playback record.

S204: extracting and playing an audio corresponding to the feature information from the preset audio library.

In this embodiment, the electronic device may extract and play the audio corresponding to the feature information from the preset audio library, wherein the preset audio library may be disposed in the above-mentioned electronic device, or may be disposed in other electronic devices in communication connection with the above-mentioned electronic device. The above-mentioned feature information corresponds to the type of the audio, and the electronic device can determine a type of an audio to be played according to the feature information, and select (for example, by ways of selecting according to a playback amount, randomly selecting, and the like) the audio from the type of audios to play.

As an example, when the feature information represents that the current emotion of the user is pleasure, an audio marked as pleasure may be extracted from the preset audio library to be played. When the feature information represents that the user is used to listening to rock music, the rock type of audio may be extracted from the preset audio library to be played.

According to the method provided by the above-mentioned embodiments of the present disclosure, by collecting the intention determination data for at least one user in the target space, determining the target vocal intention of the user according to the intention determination data, then determining the feature information according to the target vocal intention, and finally extracting and playing the audio corresponding to the feature information from the preset audio library. Accordingly, it is achieved to automatically perform a determination on the target vocal intention of the user by the electronic device, without triggering an audio playing operation by the user, and the electronic device automatically plays the audio when it is determined that the user has the vocal intention, the steps of performing the audio playing operation by the user being omitted, and the convenience of the audio playing operation being improved. In addition, by determining the current feature of the user, the played audio is adapted to the feature of the user so as to achieve an effect of more accurately playing the audio which the user wants to listen to and improve pertinence of automatic playback of the audio.

In some optional implementations, in the step S202, the target vocal intention of the at least one user may be determined based on any one of the following ways:

a first way: in response to a determination that the intention determination data includes the face image of at least one user, inputting the face image into a pre-trained third emotion recognition model to obtain emotion category information; and if the emotion category information is preset emotion type information, it is determined that the at least one user has the target vocal intention, wherein the third emotion recognition model can be obtained by training a preset initial model for training the third emotion recognition model through utilizing a preset training sample set in advance. Training samples in the training sample set may include a sample face image and corresponding emotion category information. The electronic device may train the initial model by taking the sample face image as an input of the initial model (for example, including a convolution neural network, a classifier, and the like) and the emotion category information corresponding to the input sample face image as an expected output of the initial model, so as to obtain the above-mentioned third emotion recognition model.

A preset emotion represented by the above-mentioned preset emotion type information may be one of various emotions such as excitement, pleasure, sadness, and the like. When the emotion type information output from the third emotion recognition model represents that the emotion of the user is the above-mentioned preset emotion, it is determined that at least one user has the target vocal intention. For example, when the emotion type information represents that the emotion of the user is excitement, it indicates that the user may want to sing to express the mood at the moment, and at the moment, it is determined that the user has the singing intention.

A second way: in response to a determination that the intention determination data includes sound information of at least one user, performing speech recognition on the sound information to obtain a speech recognition result; and if the speech recognition result represents that the at least one user commands to play the audio, it is determined that the at least one user has the target vocal intention.

Wherein a method of performing speech recognition on the speech information is the prior art, and will not be repeated herein. As an example, when it is recognized that a certain user produces a speech of "this song is good and I want to sing it", it is determined that the at least one user has the target vocal intention (i.e., the singing intention).

A third way: in response to a determination that the intention determination data includes sound information of at least one user, performing melody recognition on the sound information to obtain a melody recognition result; and if the melody recognition result represents that at least one user currently is producing voice in a target form, it is determined that the at least one user has the target vocal intention, wherein voice production in the above-mentioned target form corresponds to the target vocal intention. For example, voice production in the target form may include singing, reciting, humming, and the like. A method of performing melody recognition on the sound information is the prior art, and is generally performed according to the following steps of: performing melody extraction on human voice input into the melody recognition model through note segmentation and pitch extraction, and acquiring a note sequence through the melody extraction. The electronic device further matches the note sequence output by the melody recognition model with note sequences of the audios in the audio library, and if the similarity between the output note sequence and the note sequence of a certain audio is greater than a preset similarity threshold, it indicates that the user is singing (i.e., voice production in the target form), and at the moment, it is determined that the at least one user has the target vocal intention.

This implementation provides various ways for determining the target vocal intention of the user so as to implement comprehensive detection on the target vocal intention of the user by multimodal ways of emotion recognition, speech recognition, melody recognition, and the like, it has higher detection accuracy, and the audio can be played for the user subsequently based on the target vocal intention without manual operation by the user so as to improve the convenience of the audio playing operation.

In some optional implementations, in the step S203, the feature information may be determined by at least one of the following ways:

a first way: acquiring a historical audio playback record for at least one user; determining listening habit information of the at least one user based on the historical audio playback record; and determining the feature information based on the listening habit information, wherein the electronic device may acquire the historical audio playback record locally or remotely, and the listening habit information is used for representing features of the audio which the user usually listens to, such as the type, the listening time, and the like. For example, the audio type with the greatest listening times may be determined as the listening habit information based on the historical audio playback record. In general, the listening habit information may be used as information included by the feature information.

A second way: acquiring a face image of the at least one user, and inputting the face image into a pre-trained fourth emotion recognition model to obtain emotion category information representing a current emotion of the at least one user; and determining the feature information based on the emotion category information, wherein the fourth emotion recognition model may be a neural network model for performing emotion classification on the face image, and may be the same as or different from the third emotion recognition model described in the above-mentioned optional implementation, but has a training method substantially the same as the method for training the third emotion recognition model, which will not be repeated herein. Generally, the emotion category information may be used as information included by the feature information.

A third way: acquiring an environment image of an environment where the at least one user is located, and inputting the environment image into a pre-trained environment recognition model to obtain environment type information; and determining the feature information based on the emotion category information, wherein the environment image may be obtained by shooting the environment outside the target space by the camera. The environment recognition model may be a neural network model for classifying the environment image, and the electronic device may train a preset initial model for training the environment recognition model by using a preset training sample set in advance to obtain the environment recognition model. Training samples in the training sample set may include a sample environment image and the corresponding environment type information. The electronic device may train the initial model to obtain the above-mentioned environment recognition model by taking the sample environment image as an input of the initial model (for example, including a convolution neural network, a classifier, and the like), and taking the environment type information corresponding to the input sample environment image as an expected output of the initial model.

The environment type information is used for representing the type of the environment where the at least one user is located. As an example, the type of the environment is a location type such as a suburb, a highway, a village, and the like, or may be a weather type such as a sunny day, a rainy day, a snowy day, and the like. Generally, the environment type information may be used as information included by the feature information.

A fourth way: acquiring an intra-space image obtained by shooting the target space; determining the number of people in the target space based on the intra-space image; and determining the feature information based on the number of people, wherein the intra-space image may be an image shot by the camera disposed in the target space, the number of the intra-space images may be one or more, and the electronic device may determine people in the target space and count the number of people in the target space from each intra-space image based on a prior target detection method. Generally, the number of people may be used as information included by the feature information.

This implementation determines the feature information of the user by providing the above-mentioned four ways and can comprehensively detect a current state of the user, and the obtained feature information is more comprehensive, thereby facilitating extracting the audio in which the user is interested in a more targeted way based on the feature information, and improving the accuracy of playing the audio for the user.

In some optional implementations, based on the above-mentioned four ways of determining the feature information, the step S204 may be performed by:

in response to a determination that the feature information includes the listening habit information, extracting and playing an audio corresponding to the listening habit;

in response to a determination that the feature information includes the emotion category information, extracting and playing the audio corresponding to the emotion category information;

in response to a determination that the feature information includes the environment type information, extracting and playing the audio corresponding to the environment type information; and in response to a determination that the feature information includes the number of people, extracting and playing the audio corresponding to the number of people.

As an example, if the listening habit information indicates that the user likes to listen to rock music, a rock type audio may be extracted and played. If the emotion category information indicates that the current emotion of the user is pleasure, a fast rhythm type audio may be extracted and played. If the environment type information indicates that the environment where the user is currently located is the field, a relax rhythm type audio may be extracted and played. If the determined number of users is 2 or more, a chorus type audio may be extracted and played.

It should be noted that when the feature information includes at least two of the listening habit information, the emotion category information, the environment type information, and the number of people, an intersection set of the audios involved in the audio types respectively corresponding to the various types of information can be taken as an audio to be played.

This implementation can make the extracted audio more attractive to the user due to adoption of the feature information capable of comprehensively representing the features of the user, thereby improving the accuracy of playing the audio for the user.

With further reference to FIG. 3, it shows a flow schematic diagram of another embodiment of an audio playback method. As shown in FIG. 3, based on the embodiment shown in FIG. 2, after the step S204, the audio playback method may further include the following steps:

S205: extracting user audio information from a current mixed sound signal, wherein the mixed sound signal may be a signal collected by the information collection device 104 (i.e., the microphone) disposed in the target space as shown in FIG. 1. The user audio information is voice produced by a user. Generally, the sound signal collected by the microphone includes a noise signal, or includes sound signals simultaneously issued by at least two users, and the sound signal collected at the moment is the mixed sound signal. In other words, the mixed sound signal may include a noise signal, or may include sound information issued by the user, or may include both the noise signal and the sound signal issued by the user. In this embodiment, prior speech separation methods (e.g., Blind Source Separation (BSS) method, an Auditory Scene Analysis (ASA) method, and the like) can be adopted to extract user audio information respectively corresponding to each user from the mixed sound signal.

S206: playing the user audio information in a case that the user audio information meets a preset condition.

Specifically, the electronic device may analyze the extracted user audio information and play the user audio information if the user audio information meets the preset condition. As an example, if the electronic device recognizes that the user audio information represents that the user is singing, the user audio information, the volume of which is amplified, is played through a loudspeaker. Or, if the electronic device recognizes that the user audio information represents that the melody of the voice produced by the user is matched with the currently played audio, the user audio information is played.

Generally, the steps S205-S206 are performed while the audio described in step S204 is played. For example, the played audio may be music, and user audio information is extracted from a mixed sound signal currently issued by at least one user in real time while the music is played. If the user audio information is matched with the played music, the user audio information is played, thereby implementing a scene that the user sings with the music.

Optionally, a prior feedback sound elimination method can also be adopted to filter out the sound signals, played from the loudspeaker, collected by the microphone so as to reduce the interference of feedback sound on the played user audio information.

According to the method provided by the corresponding embodiment in FIG. 3, by extracting and playing the user audio information from the mixed sound signal, it can be realized that the user audio information and the audio extracted from the preset audio library are simultaneously played, a special microphone for playing sound of the user does not need to be separately provided for the user, and the voice produced by the user can be extracted from the mixed sound signal only by using a microphone for collecting mixed sound of each user in the target space and played at the same time with the currently played audio, thereby simplifying hardware required for playing the user audio information and improving the convenience of achieving the target vocal intention of the user. In addition, through playing the user audio information that meets the preset condition, it can be avoided that the interference is caused on playback of the user audio information by playing out of contents such as user conversation and the like.

With further reference to FIG. 4, it shows a flow schematic diagram of yet another embodiment of an audio playback method. As shown in FIG. 4, based on the embodiment shown in FIG. 3, the step S205 further includes the following steps of:

S2051: acquiring initial audio information collected by an audio collection device arranged in a target space, wherein the initial audio information may include a mixed sound signal.

Wherein the audio collection device is a device included by the information collection device 104 as shown in FIG. 1. The number of the audio collection devices may be one or more, and the number of paths of the initial audio information is consistent with the number of the audio collection devices, i.e. each audio collection device collects one path of initial audio information. As an example, when the target space is a vehicle interior space, the number of the audio acquisition devices may be matched with the number of seats in a vehicle. Namely, one audio collection device is installed near each seat.

S2052: performing human voice separation on the initial audio information to obtain at least one path of user audio information, wherein the at least one path of user audio information respectively corresponds to one user. Specifically, the electronic device may extract the user audio information respectively corresponding to each user from the initial audio information by using the prior speech separation method. As an example, at least one path of user audio information may be separated from the initial audio information by using a BSS algorithm. Or, when the number of the audio collection devices is equal to or greater than two, at least one path of user audio information can be separated from the initial audio information collected by each audio collection device by adopting a prior speech separation algorithm based on a microphone array.

According to the method provided by the corresponding embodiment in FIG. 4, by performing human voice separation on the initial audio information to obtain at least one path of user audio information, it can be realized that in the process of playing the audio, the respective user audio information of a plurality of users is collected in real time, and each path of user audio information excludes the sound interference of other users, so that the user audio information played subsequently can clearly reflect the sound of each user and the quality of playing the sound of the plurality of users is improved.

In some optional implementations, based on the steps S2051-S2052, the step S206 in the corresponding embodiment as shown in FIG. 3 may be performed as follows:

the volume of at least one path of user audio information is respectively adjusted to a target volume, the user audio information after the volume is adjusted is synthesized, and the synthesized user audio information is played. The target volume corresponding to each path of user audio information may be the same or may be different. For example, the volume of one path of user audio information with the maximum volume can be taken as the target volume, and the volumes of other paths of user audio information are all adjusted to the target volume; or one fixed volume can be set as the target volume, and each path of user audio information is set to have the same target volume. Further, various paths of user audio information may be synthesized into a stereo for playing, or synthesized into the same channel for playing.

By adjusting the volume of each path of user audio information and playing the user audio information after synthesization, the volume of each played user audio information can be tended to be consistent or reach the volume set respectively, so as to avoid the excessively small volume in the playing process caused by the small volume issued by the user.

In some optional implementations, based on the corresponding embodiment in FIG. 3, the step S206 may play the user audio information based on at least one of the following ways:

a first way: performing melody recognition on the user audio information to obtain user melody information; and performing matching on the user melody information and melody information of the currently played audio and playing the user audio information based on an obtained first matching result, wherein a method of performing melody recognition on the user audio information is the prior art, and is generally performed according to the following steps of: performing melody extraction on the user audio information input into the melody recognition model through note segmentation and pitch extraction, and acquiring a note sequence as melody information through melody extraction. The electronic device further performs a calculation of a similarity between the melody information output by the melody recognition model and melody information of the currently played audio. If the similarity (i.e., a first matching result) is greater than or equal to a preset first similarity threshold, it can be determined that the first matching result meets a preset condition, and the user audio information can be played.

A second way: performing speech recognition on the user audio information to obtain a speech recognition result; and performing matching on the speech recognition result and corresponding text information of the currently played audio, and playing the user audio information based on an obtained second matching result, wherein the speech recognition result may be the text information. It should be noted that a method of performing speech recognition on the user audio information is the prior art, and will not be repeated herein. The corresponding text information of the currently played audio is text information which establishes a corresponding relationship with the audio in advance. For example, if the currently played audio is a song, the corresponding text information thereof may be lyrics; and if the currently played audio is poem reading, the corresponding text information thereof is a read poem original text. The electronic device can perform a calculation of similarity between the speech recognition result and the above-mentioned corresponding text information. If the similarity (i.e., a second matching result) is greater than or equal to a preset second similarity threshold, it can be determined that the second matching result meets a preset condition, and the user audio information can be played.

It should be understood that the electronic device may execute any one of the above-mentioned first and second ways so as to play the user audio information. The above-mentioned first and second ways can also be performed simultaneously, and if it is determined that the user audio information can be played in both the ways based on the first matching result and the second matching result, the user audio information is played. It also should be noted that when the number of the paths of the user audio information is more than one path, the first way and/or the second way may be performed for each path user audio information.

In this implementation, by performing melody recognition and/or speech recognition on the user audio information, the user audio information can be played when certain conditions are met so as to avoid playing of user audio information unrelated to the currently played audio, so that the played user audio information has a higher matching degree with the currently played audio, thereby improving the quality of playing the user audio information.

In some optional implementations, based on the method provided by the corresponding embodiment in FIG. 3, the step S206 further includes:

firstly, determining a pitch of the user audio information, wherein a method of determining the pitch of the user audio information is the prior art and will not be repeated herein;

and then executing at least one of the following steps:

a first step of adjusting a pitch of the currently played audio to a target pitch matched with the pitch of the user audio information.

Specifically, the pitch of the currently played audio can be compared with the pitch of the user audio information, and if the difference between them is out of a preset difference range, the pitch of the currently played audio is adjusted to enable the difference between the pitch of the currently played audio and the pitch of the user audio information to fall within the preset difference range.

As an example, when the user audio information is user singing audio information and the currently played audio is song music, if it is determined that the pitch of the user audio information is higher or lower than a pitch of the currently played music, the pitch of the music can be dynamically adjusted so as to adapt to the pitch of user singing, i.e., the sing-along difficulty of the played music is adjusted so as to enable the user to better adapt to the played music.

A second step of outputting recommendation information for recommending an audio corresponding to the pitch of the user audio information, wherein the audio corresponding to the pitch of the user audio information may be an audio with a difference value with the user audio information in pitch within a preset difference value range. The recommendation information may be output by means of a prompt tone, a display text, an image, and the like, and after the recommendation information is output, the user can select whether to play the recommended audio, so that the pitch of the re-played audio is matched with the pitch of the user.

In this implementation, by determining the pitch of the user audio information and adjusting the played audio based on the pitch, the pitch of the played audio is automatically adapted to the pitch of the user so as to make the playing effect of the user audio information better, and at the same time, the user does not need to adjust the pitch of the played audio in an active way such as manual operation or speech control and the like so as to improve the convenience of adjusting the audio.

With further reference to FIG. 5, it shows a flow schematic diagram of still a further embodiment of an audio playback method. As shown in FIG. 5, based on the embodiment shown in FIG. 3, after the step S206, the audio playback method may further include the following steps:

S207: determining a target user corresponding to the user audio information from at least one user and acquiring a face image of the target user, wherein the face image may be an image shot by a camera disposed in the target space and included by the information collection device 104 as shown in FIG. 1. Specifically, when extracting the user audio information from the mixed sound signal, the electronic device can determine a position of a sound source corresponding to the user audio information based on the prior speech separation method (for example, determine which position in the target space the user audio information corresponds to by adopting a prior multi-sound-range speech separation method based on a microphone array), the position of the sound source is a position of the user, and the position of the user can be determined from an image shot on the user, and then the face image of the user corresponding to the user audio information can be obtained.

S208: inputting the respective face image of at least one user into a pre-trained first emotion recognition model to obtain emotion category information respectively corresponding to the at least one user. In other words, in this step, the face image of the target user corresponding to the user audio information can be input into the pre-trained first emotion recognition model and correspondingly, the emotion category information corresponding to the target user can be obtained, wherein the first emotion recognition model may be the same as or different from at least one of the third emotion recognition model and the fourth emotion recognition model described in the above-mentioned optional implementation, but has a training method substantially the same as the training method of at least one of the third emotion recognition model and the fourth emotion recognition model, which will not be repeated herein.

S209: determining a first score representing a matching degree of an emotion of at least one user and the type of the currently played audio based on the emotion category information. If the emotion category information in this step is emotion category information corresponding to the target user, the determined first score is used for representing the matching degree of an emotion of the target user and the type of the currently played audio, wherein the first score may be obtained based on a probability value calculated by the first emotion recognition model and corresponding to the output emotion category information. Generally, the first emotion recognition model can classify the input face image to obtain a plurality of pieces of emotion category information and the probability value respectively corresponding to each emotion category information, and the emotion category information corresponding to the maximum probability value can be determined as the emotion category information of the face image recognized this time.

If the emotion category information of the face image recognized this time is one type, the first score can be determined according to the probability corresponding to the one type of emotion category information. If the emotion category information of the face image recognized this time includes multiple types, the emotion category information matched with the type of the currently played audio can be determined as target emotion category information from the multiple types of emotion category information, and then the first score is determined according to the probability corresponding to the target emotion category information. The larger the value of the first score is, the greater the matching degree with the currently played audio is, wherein a corresponding relationship between the type of the currently played audio and the emotion category information may be preset. For example, if the type of the currently played audio is marked as "happiness", the first score may be obtained based on the probability corresponding to the emotion category information output by the model and representing a happy emotion.

S210: determining and outputting a score of the user audio information based on the first score.

Specifically, the score of the user audio information may be output by various ways, such as a way of being displayed on a display screen, a way of outputting sound of the score through the loudspeaker, and the like. There may be various methods of determining the score of the user audio information, and as an example, the first score may be determined as the score of the user audio information.

Alternatively, the step S209 may be performed as follows: a second score representing a matching degree of the user audio information and the currently played audio is determined based on the user audio information. In other words, in this step, the second score is determined based on the user audio information and the second score is used for representing the matching degree of the user audio information and the currently played audio.

Optionally, the step S210 may also be performed as follows: based on the second score, the score of the user audio information is determined and output.

wherein the second score may be determined by using a prior method of scoring the user audio information. For example, when the user audio information indicates that the user is singing, the second score may be determined based on a prior singing scoring method. Further, the second score may be determined as the score of the user audio information.

Optionally, the step S210 may also be performed as follows: based on the first score and the second score, the score of the user audio information is determined and output.

For example, the first score and the second score can be weighted and summed based on preset weights respectively corresponding to the first score and the second score so as to obtain the score of the user audio information.

According to the method provided by the corresponding embodiment in FIG. 5, the score of the user audio information is determined based on face image recognition and/or audio scoring, so that the score can sufficiently reflect the matching degree of the user audio information and the played audio, and the accuracy of scoring the user audio information is improved.

In some optional implementations, the step S208 may be performed as follows:

the respective face image of at least one user is input into the first emotion recognition model to obtain a first emotion category information sequence respectively corresponding to the at least one user, wherein the emotion category information in the first emotion category information sequence respectively corresponds to one face image sub-sequence. In this embodiment, the number of the face images of the user is at least two, i.e., the face image sequence of the user is input into the first emotion recognition model, and generally, the face image sequence of a certain user may be an image sequence composed of face images included in a video shot on the face of the user. The emotion category information sequence may be represented in a form of a vector, wherein each value in the vector corresponds to one face image sub-sequence and represents a certain emotion category. Each face image sub-sequence may include at least one face image. As an example, duration of the currently played audio is 3 minutes, the face of the user is shot for 3 minutes during playing, the face image sequence within the 3 minutes can be divided into 100 face image sub-sequences, and each sub-sequence is sequentially input into the first emotion recognition model to obtain a vector including 100 numerical values as the emotion category information sequence.

Based on the above-mentioned first emotion category information sequence, as shown in FIG. 6, in the above-mentioned step S209, the first score may be determined by the following steps:

S2091: acquiring a video corresponding to the currently played audio, and extracting a face image sequence of a target person from the video, wherein the target person may be a person related to the currently played audio. For example, if the currently played audio is a song, the corresponding video thereof may be a video including an image of a singer of the song, and the target person may be the singer of the song or may be a person acting with the song. The target person may be set manually in advance, or may be obtained by recognizing the video by the electronic device, and for example, based on a prior mouth action recognition method, a person of which the mouth action frequency is matched with the rhythm of the song is recognized as the target person.

The electronic device may extract the face image sequence of the target person from image frames included in the video according to the preset or recognized target person by using a prior face image detection method.

S2092: inputting the face image sequence into the first emotion recognition model to obtain a second emotion category information sequence.

This step is substantially the same as the above-mentioned step of determining the first emotion category information sequence and will not be repeated herein.

S2093: determining the similarity between the first emotion category information sequence and the second emotion category information sequence, wherein the first emotion category information sequence and the second emotion category information sequence may both be in a form of vectors, and the electronic device may determine a distance between the vectors, and determine the similarity based on the distance (for example, the reciprocal of the distance is the similarity).

S2094: determining the first score based on the similarity.

As an example, the similarity may be determined as the first score, or the similarity may be scaled according to a preset scale to obtain the first score.

In this implementation, by comparing the first emotion category information sequence of the user with the second emotion category sequence of the target person in an original video, the conformity between the emotion of the user and an emotion of the original video can be accurately determined, and the obtained first score more accurately reflects the conformity between the emotion of the user and the currently played audio, thereby improving the accuracy of scoring the user audio information.

With further reference to FIG. 7, it shows a flow schematic diagram of one more embodiment of an audio playback method. As shown in FIG. 7, based on the embodiment shown in FIG. 3, after the step S206, the audio playback method may further include the following steps:

S211: determining the target user corresponding to the user audio information from at least one user and acquiring the face image of the target user.

This step is substantially the same as the above-mentioned step S207 and will not be repeated herein.

S212: inputting the face image of the target user corresponding to the user audio information and the user audio information into a pre-trained second emotion recognition model to obtain emotion category information, wherein the second emotion recognition model in this step is different from the first emotion recognition model, the third emotion recognition model, and the fourth emotion recognition model, and the second emotion recognition model can simultaneously receive an image and an audio as inputs, perform joint analysis on the image and the audio, and output the emotion category information. The second emotion recognition model can be obtained by using a preset training sample set in advance through training a preset initial model for training the second emotion recognition model. Training samples in the training sample set may include a sample face image, sample audio information, and corresponding emotion category information. The electronic device may train the initial model by taking the sample face image and the sample audio information as inputs of the initial model (for example, including a convolution neural network, a classifier, and the like) and taking the emotion category information corresponding to the input sample face image and sample audio information as an expected output of the initial model, so as to obtain the above-mentioned third emotion recognition model. Generally, the neural network included in the initial model can determine feature information of the input sample face image and sample audio information, the classifier can classify the feature information, compare actually output information with the expected output, and adjust parameters of the initial model so that a difference between the actual output and the expected output is gradually decreased until convergence, thereby obtaining the above-mentioned second emotion recognition model through the training.

S213: determining and outputting a score representing the matching degree of the emotion of the target user corresponding to the user audio information and the type of the currently played audio based on the emotion category information, wherein the score can be obtained based on a probability value calculated by the second emotion recognition model and corresponding to the output emotion category information. The method of determining the score based on the probability value is substantially the same as the method of determining the first score in the step S209 and will not be repeated herein.

According to the method provided by the corresponding embodiment in FIG. 7, by simultaneously inputting the face image and the user audio information into the second emotion recognition model, the score is directly obtained without scoring separately the face image and the user audio information, thereby simplifying the scoring step and improving the scoring efficiency. Since the second emotion recognition model can integrate features of the input face image and user audio information to carry out classification, so that the score can accurately reflect the matching degree of the sound of the user and the played audio.

In some optional implementations, the step S212 may be performed as follows:

the face image of the user corresponding to the user audio information and the user audio information are input into the second emotion recognition model to obtain a third emotion category information sequence, wherein the emotion category information in the third emotion category information sequence respectively corresponds to one face image sub-sequence. The definition of the third emotion category information sequence is substantially the same as the first emotion category information and will not be repeated herein.

Based on this, as shown in FIG. 8, the step 213 may be performed as follows:

S2131: acquiring a video corresponding to the currently played audio, and extracting a face image sequence of the target person from the video.

This step is substantially the same as the step S2091 and will not be repeated herein.

S2132: inputting the face image sequence and the currently played audio into the second emotion recognition model to obtain a fourth emotion category information sequence.

This step is substantially the same as the step of determining the third emotion category information sequence and will not be repeated herein.

S2133: determining the similarity between the third emotion category information sequence and the fourth emotion category information sequence, wherein the third emotion category information sequence and the fourth emotion category information sequence may both be in a form of vectors, and the electronic device may determine a distance between the vectors, and determine the similarity based on the distance (for example, the reciprocal of the distance is the similarity).

S2134: determining a score representing the matching degree of the emotion of the user corresponding to the user audio information and the type of the currently played audio based on the similarity.

As an example, the similarity may be determined as the score, or the similarity may be scaled according to a preset scale to obtain the score.

Since the third emotion category information sequence and the fourth emotion category information sequence in this implementation are obtained based on the face image of the user and the user audio information and the image and the audio are integrated when emotion classification is carried out, the accuracy of representing the emotions by the two emotion category information sequences is higher, so that the score determined by using the similarity between the two emotion category information sequences can more accurately represent the conformity between the emotion of the user and the emotion of the original video, thereby further improving the accuracy of scoring the user audio information.

Exemplary Apparatus

Figure 9:
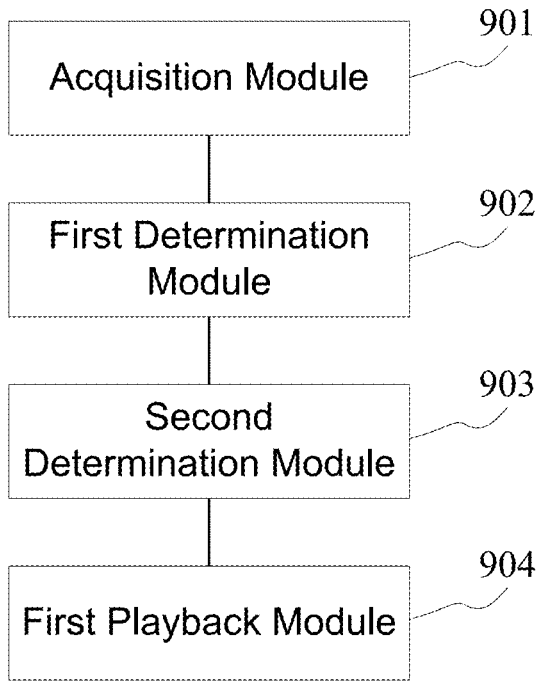
FIG. 9 is a structural schematic diagram of an audio playback apparatus provided by an exemplary embodiment of the present disclosure.

FIG. 9 is a structural schematic diagram of an audio playback apparatus provided by an exemplary embodiment of the present disclosure. This embodiment can be applied to an electronic device, and as shown in FIG. 9, an audio playback apparatus includes: an acquisition module 901 configured for acquiring intention determination data collected for at least one user in a target space; a first determination module 902 configured for determining a target vocal intention of the at least one user based on the intention determination data; a second determination module 903 configured for determining feature information representing a current feature of the at least one user based on the target vocal intention; and a first playback module 904 configured for extracting and playing an audio corresponding to the feature information from a preset audio library.

In this embodiment, the acquisition module 901 may acquire the intention determination data collected for at least one user within the target space, wherein the target space (e.g., the space 105 in FIG. 1) may be one of various spaces such as the inside of a vehicle, the inside of a room, and the like. The intention determination data may be various information used to determine an intention of the user, for example, including, but not limited to, at least one type of the following information: a face image of the user, voice produced by the user, and the like.

In this embodiment, the first determination module 902 may determine the target vocal intention of the at least one user based on the intention determination data, wherein the voice production type represented by the target vocal intention may be preset. For example, the target vocal intention may include, but not limited to, at least one of a singing intention, a reciting intention, and the like. The first determination module 902 may select a corresponding way for determining the target vocal intention according to the type of the intention determination data.

As an example, when the intention determination data includes the face image data of the user, emotion recognition may be performed on the face image to obtain an emotion type, and if the emotion type indicates pleasure, it may be determined that the at least one user has the target vocal intention (e.g., the singing intention). When the intention determination data includes a sound signal issued by the user, the sound signal may be recognized. If a recognition result indicates that the user is humming, it may be determined that there is the target vocal intention.

In this embodiment, the second determination module 903 may determine the feature information representing the current feature of the at least one user, wherein the current feature of the user may include, but be not limited to, at least one of the emotion of the user, the number of users, the listening habits of the user, and the like. The second determination module 903 may determine the feature information by ways respectively corresponding to the above-mentioned various features. For example, the face image shot by a camera on the user can be acquired, and emotion recognition is performed on the face image so as to obtain the feature information representing the current emotion of the user. For another example, a historical playback record of the user may be acquired, and the type of an audio that the user is used to listening to may be determined as the feature information from the historical playback record.

In this embodiment, the first playback module 904 may extract and play the audio corresponding to the feature information from the preset audio library, wherein the preset audio library may be disposed in the above-mentioned electronic device, or may be disposed in other electronic devices in communication connection with the above-mentioned electronic device. The above-mentioned feature information corresponds to the type of the audio, and the first playback module 904 can determine a type of an audio to be played according to the feature information, and select (for example, by ways of selecting according to a playback amount, randomly selecting, and the like) the audio from the type of audios to play.

As an example, when the feature information represents that the current emotion of the user is pleasure, an audio marked as pleasure may be extracted from the preset audio library to be played. When the feature information represents that the user is used to listening to rock music, the rock type of audio may be extracted from the preset audio library to be played.

Figure 10:
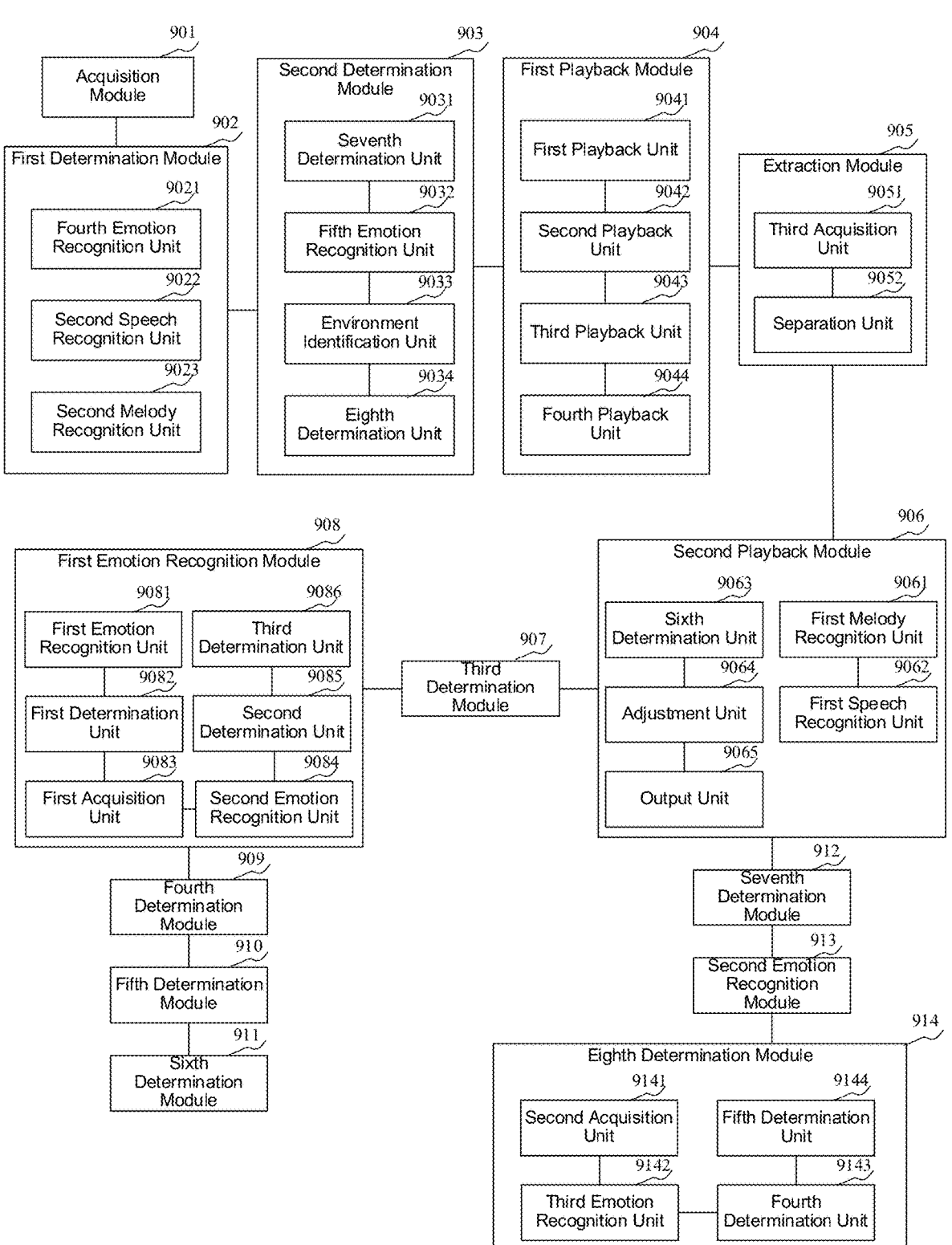
FIG. 10 is a structural schematic diagram of an audio playback apparatus provided by another exemplary embodiment of the present disclosure.

With reference to FIG. 10, FIG. 10 is a structural schematic diagram of an audio playback apparatus provided by another exemplary embodiment of the present disclosure.

In some optional implementations, the apparatus further includes: an extraction module 905 configured for extracting user audio information from a current mixed sound signal; and a second playback module 906 configured for playing the user audio information in a case that the user audio information meets a preset condition.

In some optional implementations, the apparatus further includes: a third determination module 907 configured for determining a target user corresponding to the user audio information from at least one user and acquiring a face image of the target user; a first emotion recognition module 908 configured for inputting the face image of the target user corresponding to the user audio information into a pretrained first emotion recognition model to obtain emotion category information corresponding to the target user; a fourth determination module 909 configured for determining a first score representing a matching degree of an emotion of the target user corresponding to the user audio information and the type of the currently played audio based on the emotion category information; and/or a fifth determination module 910 configured for determining a second score representing a matching degree of the user audio information and the currently played audio based on the user audio information; and a sixth determination module 911 configured for determining a score of the user audio information based on the first score and/or the second score and outputting the score.

In some optional implementations, the first emotion recognition module 908 includes: a first emotion recognition unit 9081 configured for inputting a respective face image of at least one user into the first emotion recognition model to obtain a first emotion category information sequence respectively corresponding to the at least one user, wherein the emotion category information in the first emotion category information sequence respectively corresponds to one face image sub-sequence; a first determination unit 9082 configured for determining the first score representing a matching degree of an emotion of at least one user and the type of the currently played audio based on the emotion category information; a first acquisition unit 9083 configured for acquiring a video corresponding to the currently played audio, and extracting a face image sequence of a target person from the video; a second emotion recognition unit 9084 configured for inputting the face image sequence into the first emotion recognition model to obtain a second emotion category information sequence; a second determination unit 9085 configured for determining the similarity between the first emotion category information sequence and the second emotion category information sequence; and a third determination unit 9086 configured for determining the first score based on the similarity.

In some optional implementations, the apparatus further includes: a seventh determination module 912 configured for determining a target user corresponding to the user audio information from at least one user and acquiring a face image of the target user; a second emotion recognition module 913 configured for inputting the face image of the target user corresponding to the user audio information and the user audio information into a pre-trained second emotion recognition model to obtain the emotion category information: and an eighth determination module 914 configured for determining a score representing the matching degree of the emotion of the target user corresponding to the user audio information and the type of audio currently played based on the emotion category information and outputting the score.

In some optional implementations, the second emotion recognition module 913 is further configured for: inputting the face image of the user corresponding to user audio information and the user audio information into the second emotion recognition model to obtain a third emotion category information sequence, wherein the emotion category information in the third emotion category information sequence respectively corresponds to one face image sub-sequence; and the eighth determination module 914 includes: a second acquisition unit 9141 configured for acquiring the video corresponding to the currently played audio and extracting the face image sequence of the target person from the video; a third emotion recognition unit 9142 configured for inputting the face image sequence and the currently played audio into the second emotion recognition model to obtain a fourth emotion category information sequence; a fourth determination unit 9143 configured for determining the similarity between the third emotion category information sequence and the fourth emotion category information sequence; and a fifth determination unit 9144 configured for determining a score representing a matching degree of the emotion of the user corresponding to the user audio information and the type of the currently played audio based on the similarity.

In some optional implementations, the extraction module 905 includes: a third acquisition unit 9051 configured for acquiring initial audio information collected by an audio collection device arranged in a target space, the initial audio information including a mixed sound signal; and a separation unit 9052 configured for performing human voice separation on the initial audio information to obtain at least one path of user audio information, wherein the at least one path of user audio information corresponds to one user, respectively.

In some optional implementations, the second playback module 906 is further configured for: respectively adjusting the volume of at least one path of user audio information to a target volume, synthesizing the user audio information after the volume is adjusted, and playing the synthesized user audio information.

In some optional implementations, the second playback module 906 includes: a first melody recognition unit 9061 configured for performing melody recognition on the user audio information to obtain user melody information, performing matching on the user melody information and melody information of the currently played audio, and playing the user audio information based on an obtained first matching result; and/or a first speech recognition unit 9062 configured for performing speech recognition on the user audio information to obtain a speech recognition result; and performing matching on the speech recognition result and corresponding text information of the currently played audio, and playing the user audio information based on an obtained second matching result.

In some optional implementations, the second playback module 906 includes: a sixth determination unit 9063 configured for determining a pitch of the user audio information; an adjustment unit 9064 configured for adjusting a pitch of the currently played audio to a target pitch matched with the pitch of the user audio information; and/or an output unit 9065 configured for outputting recommendation information for recommending an audio corresponding to the pitch of the user audio information.

In some optional implementations, the first determination module 902 includes: a fourth emotion recognition unit 9021 configured for: in response to a determination that the intention determination data includes the face image of at least one user, inputting the face image into a pre-trained third emotion recognition model to obtain emotion category information, where if the emotion category information is preset emotion type information, it is determined that at least one user has the target vocal intention; or a second speech recognition unit 9022 configured for: in response to a determination that the intention determination data includes sound information of at least one user, performing speech recognition on the sound information to obtain a speech recognition result, where if the speech recognition result represents that at least one user commands to play the audio, it is determined that the at least one user has the target vocal intention; or a second melody recognition unit 9023 configured for: in response to a determination that the intention determination data includes sound information of at least one user, performing melody recognition on the sound information to obtain a melody recognition result, where if the melody recognition result represents that at least one user currently carries out voice production in a target form, it is determined that the at least one user has the target vocal intention.

In some optional implementations, the second determination module 903 includes: a seventh determination unit 9031 configured for acquiring a historical audio playback record for at least one user; determining listening habit information of the at least one user based on the historical audio playback record; and determining the feature information based on the listening habit information; and/or a fifth emotion recognition unit 9032 configured for acquiring a face image of at least one user and inputting the face image into a pre-trained fourth emotion recognition model to obtain emotion category information representing a current emotion of the at least one user; and determining the feature information based on the emotion category information, and/or an environment recognition unit 9033 configured for acquiring an environment image of an environment where the at least one user is located and inputting the environment image into a pre-trained environment recognition model to obtain environment type information; and determining the feature information based on the environment type information; and/or an eighth determination unit 9034 configured for acquiring an intra-space image obtained by shooting the target space; determining the number of people in the target space based on the intra-space image; and determining the feature information based on the number of people.

In some optional implementations, the first playback module 904 includes: a first playback unit 9041 configured for: in response to a determination that the feature information includes the listening habit information, extracting and playing an audio corresponding to the listening habit; a second playback unit 9042 configured for: in response to a determination that the feature information includes the emotion category information, extracting and playing the audio corresponding to the emotion category information; a third playback unit 9043 configured for: in response to a determination that the feature information includes the environment type information, extracting and playing the audio corresponding to the environment type information; and a fourth playback unit 9044 configured for: in response to a determination that the feature information includes the number of people, extracting and playing the audio corresponding to the number of people.

According to the audio playback apparatus provided by the above-mentioned embodiment of the present disclosure, by collecting the intention determination data for at least one user in the target space, determining the target vocal intention of the user according to the intention determination data, then determining the feature information according to the target vocal intention, and finally extracting and playing the audio corresponding to the feature information from the preset audio library. Accordingly, it is achieved to automatically perform a determination on the target vocal intention of the user by the electronic device, and the electronic device automatically plays the audio when it is determined that the user has the vocal intention, without triggering an audio playing operation by the user, the steps of performing the audio playing operation by the user being omitted, and the convenience of the audio playing operation being improved. In addition, by determining the current feature of the user, the played audio is adapted to the feature of the user so as to achieve an effect of more accurately playing the audio which the user wants to listen to and improve pertinence of automatic playback of the audio.

Exemplary Electronic Device

An electronic device according to an embodiment of the present disclosure will be described below with reference to FIG. 11. The electronic device may be any one or two of the terminal device 101 and the server 103 as shown in FIG. 1, or a stand-alone device independent of the terminal device 101 and the server 103, and the stand-alone device may communicate with the terminal device 101 and the server 103 so as to receive collected input signals from them.

Figure 11:
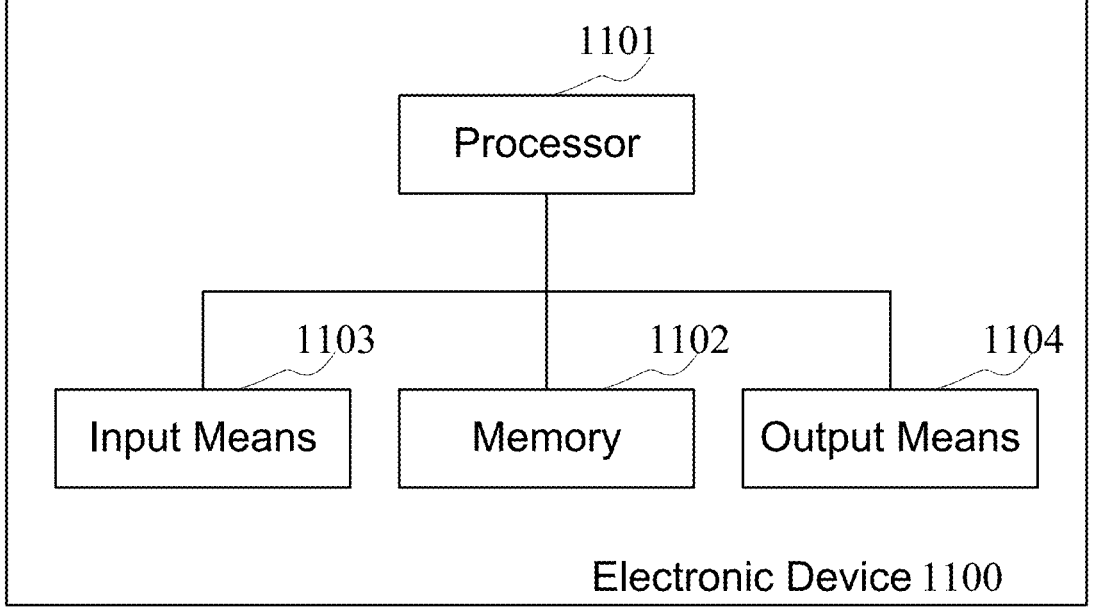
FIG. 11 is a structure diagram of an electronic device provided by an exemplary embodiment of the present disclosure.

FIG. 11 illustrates a block diagram of an electronic device according to an embodiment of the present disclosure.

As shown in FIG. 11, an electronic device 1100 includes one or more processors 1101 and a memory 1102.

The processor 1101 may be a Central Processing Unit (CPU) or other forms of processing units with data processing capacity and/or instruction execution capacity, and can control other components in the electronic device 1100 to perform expected functions.

The memory 1102 may include one or more computer program products which may include various forms of computer readable storage media, e.g., a volatile memory and/or a non-volatile memory. The volatile memory, for example, may include a Random Access Memory (RAM) and/or a cache, and the like. The non-volatile memory, for example, may include a Read-Only Memory (ROM), a hard disk, a flash memory, and the like. One or more computer program instructions may be stored on the computer readable storage medium, and the processor 1101 may operate the program instructions to implement the audio playback method provided by each embodiment of the present disclosure and/or other expected functions. Various contents such as intention determination data, feature information, audios, and the like may also be stored in the computer readable storage medium.

In one example, the electronic device 1100 may further include: an input means 1103 and an output means 1104, and these components are interconnected by a bus system and/or other forms of connection mechanisms (not shown).

For example, when the electronic device is the terminal device 101 or the server 103, the input means 1103 may be a device such as a camera, a microphone, and the like for inputting the intention determination data. When the electronic device is the stand-alone device, the input means 1103 may be a communication network connector for receiving the input intention determination data from the terminal device 101 and the server 103.

The output means 1104 may output various information, including an extracted audio, to the outside. The output means 1104 may include, for example, a display, a loudspeaker, a communication network, a connected remote output device thereof, and the like.

Certainly, for simplicity, FIG. 11 only shows some of components of the electronic device 1100 related to the present disclosure, and components such as a bus, an input/output interface, and the like are omitted. In addition, the electronic device 1100 may further include any other proper components according to the specific application.

Exemplary Computer Program Product and Computer Readable Storage Medium

In addition to the method and the apparatus described above, the embodiments of the present disclosure may also be a computer program product including a computer program instruction. When the computer program instruction is operated by a processor, the processor executes the steps in the audio playback method according to various embodiments of the present disclosure as described in the "Exemplary Method" of this specification.

The computer program product may write a program code for executing operations of the embodiments of the present disclosure in a random combination of one or more programming languages, and the programming languages include object-oriented programming languages such as Java, C++, and the like, and conventional procedural programming languages such as the "C" language or similar programming languages. The program code may be executed completely on a user computing device, executed partially on a user device, executed as a stand-alone software package, executed partially on the user computing device and partially on a remote computing device, or executed completely on the remote computing device or the server.

In addition, embodiments of the present disclosure may also be a computer readable storage medium storing the computer program instruction. When the computer program instruction is performed by a processor, the processor executes the steps in the audio playback method according to various embodiments of the present disclosure as described in the "Exemplary Method" of this specification.

The computer readable storage medium may take any combination of one or more readable media. The readable medium may be a readable signal medium or a readable storage medium. The readable storage medium, for example, may include, but be not limited to, electricity, magnetism, light, electromagnetism, infrared rays, or a semiconductor system, apparatus, or device, or any combination thereof. More specific examples (a non-exhaustive list) of the readable storage medium include: an electrical connection with one or more wires, a portable disk, the hard disk, the RAM, the ROM, an Erasable Programmable Read-Only Memory (EPROM) or a flash memory, an optical fiber, a portable Compact Disc Read-Only Memory (CD-ROM), an optical storage device, a magnetic storage device, or any suitable combination thereof.

The basic principles of the present disclosure are described above in connection with the specific embodiments, but it should be noted that the advantages, superiorities, effects, and the like mentioned in the present disclosure are merely exemplary, but not limitative, and these advantages, superiorities, effects, and the like should not be considered essential to each embodiment of the present disclosure. In addition, the specific details disclosed above are just for purpose of illustration and for facilitating understanding, but are not limitative, and the details above are not intended to limit the present disclosure to the case that the present disclosure has to be implemented by adopting the specific details above.

Each embodiment in this specification is described in a progressive mode, each embodiment is focused on differences from the other embodiments, and the same or similar parts among the embodiments may refer to each other. With respect to the system embodiment, the system embodiment basically corresponds to the method embodiment, and thus is relatively simply described, and the related points may refer to part of description in the method embodiment.

The block diagrams of the related devices, apparatuses, devices, and systems in the present disclosure merely serve as exemplary examples and are not intended to require or imply that connection, arrangement, and configuration must be carried out by ways as shown in the block diagrams. The devices, the apparatuses, the devices, and the systems may be connected, arranged, and configured in any manner, as those skilled in the art will appreciate. Words such as "including", "comprising", "having", and the like are open words and refer to "including, but not limited to", and can be interchanged with it for use. Words "or" and "and" used herein refer to the word "and/or" and can be interchanged with it for use, unless the context clearly indicates otherwise. The word "such as" used herein refers to the phrase "such as, but not limited to", and can be interchanged with it for use.

The method and the apparatus of the present disclosure may be implemented in many ways. For example, the method and the apparatus of the present disclosure may be implemented by software, hardware, firmware, or any combination thereof. The above-described order of the steps for the methods is only for illustration, and the steps of the methods of the present disclosure are not limited to the order specifically described above unless specified in other ways otherwise. In addition, in some embodiments, the present disclosure may also be implemented as programs recorded in a recording medium, and these programs include machine readable instructions for implementing the method according to the present disclosure. Therefore, the present disclosure also covers the recording medium storing the programs for executing the method according to the present disclosure.

It should also be noted that in the apparatus, the devices, and the methods of the present disclosure, each component or each step may be decomposed and/or recombined. Such decompositions and/or recombinations should be considered as equivalent solutions of the present disclosure.

The description above in the disclosed aspects is provided to enable any skilled in the art to make or use the present disclosure. Various modifications to these aspects are very apparent for those skilled in the art, and the general principles defined herein may be applied to other aspects without departing from the scope of the present disclosure. Therefore, the present disclosure is not intended to be limited to the aspects shown herein, but accords with the widest scope consistent with the principles and novel features disclosed herein.

The foregoing description has been given out for the purposes of illustration and description. In addition, the description is not intended to limit the embodiments of the present disclosure to the form disclosed herein. Although a plurality of example aspects and embodiments have been discussed above, those skilled in the art will be aware of certain variations, modifications, changes, additions, and sub-combinations thereof.

The invention claimed is:

1. An audio playback method, including:

acquiring intention determination data collected for at least one user within a target space;

determining a target vocal intention which the at least one user has by emotion recognition, speech recognition, or melody recognition based on the intention determination data;

determining feature information representing a current feature of the at least one user based on the target vocal intention;

extracting and playing an audio corresponding to the feature information from a preset audio library;

extracting user audio information from a current mixed sound signal;

playing the user audio information in a case that the user audio information meets a preset condition;

determining a target user corresponding to the user audio information from the at least one user and acquiring a face image of the target user;

inputting the face image of the target user corresponding to the user audio information and the user audio information into a pre-trained second emotion recognition model to obtain emotion category information, wherein the emotion category information includes a third emotion category information sequence; and determining and outputting a score representing a matching degree of an emotion of the target user corresponding to the user audio information and a type of a currently played audio based on the emotion category information, wherein determining the score representing the matching degree of the emotion of the target user corresponding to the user audio information and the type of the currently played audio based on the emotion category information includes:

acquiring an original video corresponding to the currently played audio, and extracting a face image sequence of a target person from the original video;

inputting the face image sequence and the currently played audio into the second emotion recognition model to obtain a fourth emotion category information sequence, wherein the fourth emotion category information sequence represents an emotion of the original video;

determining a similarity between the third emotion category information sequence and the fourth emotion category information sequence; and determining the score representing the matching degree of the emotion of the user corresponding to the user audio information and the type of the currently played audio based on the similarity.

2. The method according to claim 1, further comprising: after the determining a target user corresponding to the user audio information from the at least one user and acquiring a face image of the target user, inputting the face image of the target user corresponding to the user audio information into a pre-trained first emotion recognition model to obtain emotion category information corresponding to the target user;

determining a first score representing the matching degree of the emotion of the target user corresponding to the user audio information and the type of the currently played audio based on the emotion category information corresponding to the target user, and/or determining a second score representing a matching degree of the user audio information and the currently played audio based on the user audio information; and determining and outputting a score of the user audio information based on the first score and/or the second score.

3. The method according to claim 1, wherein inputting the face image of the target user corresponding to the user audio information and the user audio information into the pre-trained second emotion recognition model to obtain the emotion category information includes:

inputting the face image of the target user corresponding to the user audio information and the user audio information into the second emotion recognition model to obtain the third emotion category information sequence, wherein emotion category information in the third emotion category information sequence respectively corresponds to one face image sub-sequence.

4. The method according to claim 1, wherein extracting the user audio information from the current mixed sound signal includes:

acquiring initial audio information collected by an audio collection device arranged in the target space, the initial audio information including the mixed sound signal; and performing human voice separation on the initial audio information to obtain at least one path of user audio information, wherein the at least one path of user audio information corresponds to one user, respectively.

5. The method according to claim 1, wherein playing the user audio information based on the user audio information includes:

performing melody recognition on the user audio information to obtain user melody information; and performing matching on the user melody information and melody information of the currently played audio and playing the user audio information based on an obtained first matching result, and/or performing speech recognition on the user audio information to obtain a speech recognition result; and performing matching on the speech recognition result and corresponding text information of the currently played audio, and playing the user audio information based on an obtained second matching result.

6. The method according to claim 1, wherein determining the target vocal intention which the at least one user has based on the intention determination data includes:

in response to a determination that the intention determination data includes a face image of the at least one user, inputting the face image into a pre-trained third emotion recognition model to obtain emotion category information output by the third emotion recognition model, wherein, if the emotion category information output by the third emotion recognition model is preset emotion type information, it is determined that the at least one user has the target vocal intention; or in response to a determination that the intention determination data includes sound information of the at least one user, performing speech recognition on the sound information to obtain a speech recognition result, wherein, if the speech recognition result represents that the at least one user commands to play the audio, it is determined that the at least one user has the target vocal intention; or in response to a determination that the intention determination data includes sound information of the at least one user, performing melody recognition on the sound information to obtain a melody recognition result, wherein, if the melody recognition result represents that the at least one user currently is producing voice in a target form, it is determined that the at least one user has the target vocal intention.

7. The method according to claim 1, wherein determining the feature information representing the current feature of the at least one user includes:

acquiring a historical audio playback record for the at least one user; determining listening habit information of the at least one user based on the historical audio playback record; and determining the feature information based on the listening habit information; and/or acquiring a face image of the at least one user, and inputting the face image into a pre-trained fourth emotion recognition model to obtain emotion category information representing a current emotion of the at least one user; and determining the feature information based on the emotion category information output by the fourth emotion recognition model; and/or acquiring an environment image of an environment where the at least one user is located, and inputting the environment image into a pre-trained environment recognition model to obtain environment type information; and determining the feature information based on the environment type information; and/or acquiring an intra-space image obtained by shooting the target space; determining a number of people in the target space based on the intra-space image; and determining the feature information based on the number of people.

8. A non-transitory computer readable storage medium, in which a computer program is stored, the computer program being for executing the method according to claim 1.

9. The non-transitory computer readable storage medium according to claim 8, wherein the method further comprises: after the determining a target user corresponding to the user audio information from the at least one user and acquiring a face image of the target user, inputting the face image of the target user corresponding to the user audio information into a pre-trained first emotion recognition model to obtain emotion category information corresponding to the target user;

determining a first score representing the matching degree of the emotion of the target user corresponding to the user audio information and the type of the currently played audio based on the emotion category information corresponding to the target user, and/or determining a second score representing a matching degree of the user audio information and the currently played audio based on the user audio information; and determining and outputting a score of the user audio information based on the first score and/or the second score.

10. The non-transitory computer readable storage medium according to claim 8, wherein inputting the face image of the target user corresponding to the user audio information and the user audio information into the pre-trained second emotion recognition model to obtain the emotion category information includes:

inputting the face image of the target user corresponding to the user audio information and the user audio information into the second emotion recognition model to obtain the third emotion category information sequence, wherein emotion category information in the third emotion category information sequence respectively corresponds to one face image sub-sequence.

11. The non-transitory computer readable storage medium according to claim 8, wherein extracting the user audio information from the current mixed sound signal includes:

acquiring initial audio information collected by an audio collection device arranged in the target space, the initial audio information including the mixed sound signal; and performing human voice separation on the initial audio information to obtain at least one path of user audio information, wherein the at least one path of user audio information corresponds to one user, respectively.

12. The non-transitory computer readable storage medium according to claim 8, wherein playing the user audio information based on the user audio information includes:

performing melody recognition on the user audio information to obtain user melody information; and performing matching on the user melody information and melody information of the currently played audio and playing the user audio information based on an obtained first matching result, and/or performing speech recognition on the user audio information to obtain a speech recognition result; and performing matching on the speech recognition result and corresponding text information of the currently played audio, and playing the user audio information based on an obtained second matching result.

13. The non-transitory computer readable storage medium according to claim 8, wherein determining the target vocal intention which the at least one user has based on the intention determination data includes:

in response to a determination that the intention determination data includes a face image of the at least one user, inputting the face image into a pre-trained third emotion recognition model to obtain emotion category information output by the third emotion recognition model, wherein, if the emotion category information output by the third emotion recognition model is preset emotion type information, it is determined that the at least one user has the target vocal intention; or in response to a determination that the intention determination data includes sound information of the at least one user, performing speech recognition on the sound information to obtain a speech recognition result, wherein, if the speech recognition result represents that the at least one user commands to play the audio, it is determined that the at least one user has the target vocal intention; or in response to a determination that the intention determination data includes sound information of the at least one user, performing melody recognition on the sound information to obtain a melody recognition result, wherein, if the melody recognition result represents that the at least one user currently is producing voice in a target form, it is determined that the at least one user has the target vocal intention.

14. The non-transitory computer readable storage medium according to claim 8, wherein determining the feature information representing the current feature of the at least one user includes:

acquiring a historical audio playback record for the at least one user; determining listening habit information of the at least one user based on the historical audio playback record; and determining the feature information based on the listening habit information; and/or acquiring a face image of the at least one user, and inputting the face image into a pre-trained fourth emotion recognition model to obtain emotion category information representing a current emotion of the at least one user; and determining the feature information based on the emotion category information output by the fourth emotion recognition model; and/or acquiring an environment image of an environment where the at least one user is located, and inputting the environment image into a pre-trained environment recognition model to obtain environment type information; and determining the feature information based on the environment type information; and/or acquiring an intra-space image obtained by shooting the target space; determining a number of people in the target space based on the intra-space image; and determining the feature information based on the number of people.

15. An electronic device, including:

a processor; and a memory for storing a processor executable instruction, the processor being configured for reading and executing the executable instruction from the memory to implement the method according to claim 1.

* * * * *